(12) United States Patent
Simpson

(10) Patent No.: US 12,051,095 B2
(45) Date of Patent: Jul. 30, 2024

(54) COMPUTER IMPLEMENTED MULTI-CURRENCY INVOICE CAPTURE, TRADING, ACCESS AND PAYMENT SYSTEM

(71) Applicant: BILLTRADER PTY LTD, Newport (AU)

(72) Inventor: Justin Ryan Simpson, Newport (AU)

(73) Assignee: BILLTRADER PTY LTD, Newport (AU)

( * ) Notice: Subject to any disclaimer, the term of this patent is extended or adjusted under 35 U.S.C. 154(b) by 235 days.

(21) Appl. No.: 16/913,321

(22) Filed: Jun. 26, 2020

(65) Prior Publication Data

US 2020/0334725 A1 Oct. 22, 2020

Related U.S. Application Data

(63) Continuation of application No. 15/735,093, filed as application No. PCT/AU2016/050470 on Jun. 10, 2016, now abandoned.

(30) Foreign Application Priority Data

Jun. 12, 2015 (AU) .............................. 2015/902222

(51) Int. Cl.
  *G06Q 30/00* (2023.01)
  *G06Q 20/02* (2012.01)
  (Continued)

(52) U.S. Cl.
  CPC .............. *G06Q 30/04* (2013.01); *G06Q 20/02* (2013.01); *G06Q 20/381* (2013.01); *G06Q 50/184* (2013.01)

(58) Field of Classification Search
  CPC ...... G06Q 30/04; G06Q 20/02; G06Q 20/381; G06Q 50/184; G06Q 10/10; G06V 30/40
  (Continued)

(56) References Cited

U.S. PATENT DOCUMENTS

| 7,167,844 | B1 * | 1/2007 | Leong | G06Q 50/188 705/37 |
| 7,512,564 | B1 * | 3/2009 | Geer | G06Q 20/40 705/45 |

(Continued)

FOREIGN PATENT DOCUMENTS

| KR | 2009048414 A | * | 5/2009 | ......... G06Q 10/0875 |
| WO | WO-0215098 A2 | * | 2/2002 | ........... G06Q 20/102 |

(Continued)

OTHER PUBLICATIONS

International Search Report for PCT/AU2016/050470, Completed by the Australian Patent Office on Aug. 24, 2016, 13 Pages.

*Primary Examiner* — Russell S Glass
(74) *Attorney, Agent, or Firm* — Brooks Kushman PC

(57) ABSTRACT

A computer-implemented invoice capture, trading, access and payment systems and method. In particular, to a computer-implemented invoice capture, trading, access and payment system and method that facilitates the automated capture of invoices in multiple currencies, the trading of those invoices against each other and into different currencies, and which generates payment instruction files capable of effecting the efficient payment of those invoices around the world.

19 Claims, 17 Drawing Sheets

(51) Int. Cl.
*G06Q 20/38* (2012.01)
*G06Q 30/04* (2012.01)
*G06Q 50/18* (2012.01)

(58) Field of Classification Search
USPC .......................................................... 705/34
See application file for complete search history.

(56) References Cited

U.S. PATENT DOCUMENTS

| | | |
|---|---|---|
| 7,966,231 B2 | 6/2011 | Foster |
| 8,595,235 B1 | 11/2013 | Sampson et al. |
| 2004/0107153 A1 | 6/2004 | Lundberg |
| 2006/0129809 A1 | 6/2006 | Battagin et al. |
| 2008/0120129 A1* | 5/2008 | Seubert ................ G06Q 40/125 705/305 |
| 2008/0144881 A1 | 6/2008 | Fortune et al. |
| 2012/0265655 A1* | 10/2012 | Stroh ..................... G06Q 40/00 705/30 |
| 2012/0290474 A1 | 11/2012 | Hoke |
| 2013/0030967 A1* | 1/2013 | Prasad ................... G06Q 10/10 705/37 |
| 2013/0088757 A1 | 4/2013 | Schmidtler et al. |
| 2014/0032406 A1 | 1/2014 | Roach et al. |

FOREIGN PATENT DOCUMENTS

| | | | |
|---|---|---|---|
| WO | WO-2005106726 A1 * | 11/2005 | ............ G06Q 20/14 |
| WO | 2006037662 | 4/2006 | |
| WO | 2015012991 | 1/2015 | |

* cited by examiner

FIG. 3A

| Biller Ref Synonym | Country |
|---|---|
| `My ref_ | US, GB, AU |
| `Matter number_ | AU |
| ŭ | |
| `Case reference_ | CA, JP, UK |
| `Our file_ | US, GB |

| Payer Ref Synonym | Country |
|---|---|
| `Your ref_ | US, GB, AU |
| `Your file_ | AU |
| ŭ | |
| `Client reference_ | CA, JP, UK |
| `Your matter_ | US, GB |

COMPUTER IMPLEMENTED MULTI-CURRENCY INVOICE CAPTURE, TRADING, ACCESS AND PAYMENT SYSTEM

CROSS-REFERENCE TO RELATED APPLICATIONS

This application is a continuation of U.S. application Ser. No. 15/735,093 Filed Dec. 8, 2017, which is the U.S. national phase of PCT/AU2016/050470 Filed Jun. 10, 2016 which claims priority to AU 2015/902222 Filed Jun. 12, 2015 the disclosures of which are hereby incorporated in their entirety by reference herein.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to computer-implemented invoice capture, trading, access and payment systems. In particular, it relates to such systems which are capable of operating across multiple currencies and countries.

The invention has been developed specifically for capturing, trading and paying invoices in industrial property matters, and will be described below with reference to that application. However, it will be appreciated that it is not limited to that particular use, and is also suitable for capturing, trading, accessing and paying invoices between entities transacting in different currencies in a variety of fields.

BACKGROUND

Industrial property rights such as patents only provide protection in a single country/region. As such, if a person wishes to obtain patent protection in many countries they need to enlist the help of patent firms in each county of interest. The patent firms which exchange such work, because they are located in multiple countries, exchange invoices in a variety of different currencies. Each patent firm uses an accounting system in their home country which operates in their home country. One problem of the prior art is that the accounting systems from different countries are not compatible with one another. A further problem is that the banking systems that patent firms use to pay one another are neither compatible with the accounting systems the firms use, nor are the international banking transfer formats compatible with one another.

When a foreign patent firm's invoice is received, it needs to be entered into the local patent firm's accounting system. This is typically done manually, with a user reading the biller's name, finding a corresponding name in their accounting records and recording the invoice against that supplier name. Existing automated invoice capture systems have generally been designed with one currency in mind and therefore the information capture by a system in one country may not be compatible with an accounting system in another country. Furthermore, in the IP world, each patent firm uses an internal reference to uniquely identify a particular matter. Existing invoice data capture tools are incompatible with patent firm accounting systems because they fail to capture such internal references.

Another disadvantage is that the local patent attorneys' accounting system is in their home currency, but the foreign patent attorneys' invoice is in a foreign currency. A conversion needs to happen into the home currency, but it is difficult to determine which exchange rate to use since exchange rates fluctuate regularly and the rate on the day the invoice was issued differs from the date the invoice was entered into the accounts which again differs from the date the. invoice gets paid. As such, the currency used by the accounting system is often inconsistent with the bank or foreign exchange provider used to transfer money in payment of such invoices. Because the exchange rates differ, the total amounts paid or received do not match the numbers stored in the patent firm's accounting system. This incompatibility between exchange rates within accounting software and third party funds transfer providers is one disadvantage of known systems.

A further disadvantage of current systems is that in order to pay a bill in a foreign country, a user has to initiate an international wire transfer transaction. An international wire transfer is needed because the accounting system of patent firm in country A is incompatible with the banking system used by receiving patent firm in country B. Each banking system around the world uses a different format for their local transactions, which is incompatible with the transfer format used to send money internationally.

It is an object of the present invention to overcome or ameliorate at least one of the disadvantages of the prior art or to provide a useful alternative.

SUMMARY

According to a first broad aspect of the present invention there is disclosed a computer-implemented invoice capture system including a processing computer having a central processing unit and a memory, the memory storing an invoice database, a supplier database and a client database and wherein the system is configured to perform the steps of:
a) receiving an invoice image containing invoice information;
b) analyzing the invoice image to identify at least one biller name and a payer name and storing the biller and payer names in an invoice record in the invoice database;
c) comparing the biller and payer names identified in the invoice image with client records and supplier records in the client and supplier databases using a fuzzy matching algorithm;
d) where a fuzzy but not exact match is found, overwriting the biller or payer name identified in the invoice image in the invoice record with the matched biller or payer name from the client or supplier database.

The step of analyzing the image file may further include:
a) identifying an image invoice currency and storing it in the invoice record in the invoice database;
b) comparing the image invoice currency with a biller invoice currency stored in the client or supplier database and, where the currencies don't match;
c) overwriting the image invoice currency in the invoice database with the biller currency from the client or supplier database.

According to this aspect, there is also provided a computer-implemented invoice capture method, comprising:

a) receiving an invoice image containing invoice information;
b) analyzing the invoice image to identify at least one biller name and a payer name and storing the biller and payer names in an invoice record in an invoice database;
c) comparing the biller and payer names identified in the invoice image with client records and supplier records in the client and supplier databases using a fuzzy matching algorithm;
d) where a fuzzy but not exact match is found, overwriting the biller or payer name identified in the invoice image in the invoice record with the matched biller or payer name from the client or supplier database.

According to a second broad aspect of the present invention there is disclosed a computer-implemented invoice capture system, comprising:
a processing computer having a central processing unit and a memory, the memory storing an invoice database, a client database and stored instructions adapted to perform the steps of:
a) receiving an invoice image containing invoice information;
b) identifying a payer name of a payer by analyzing the invoice image;
c) retrieving from the client database a list of required invoice fields corresponding to the payer name, wherein said required invoice fields represent a set of fields required by accounting software of the payer;
d) identifying invoice data corresponding to each of the required invoice fields by further analyzing the invoice image; and
e) storing the identified invoice data in an invoice record in the invoice database.

The stored instructions may be adapted to perform the further steps of:
f) generating an invoice upload file compatible with the accounting software of the payer; and
g) writing into the invoice upload file the identified invoice data corresponding to each of the required invoice fields.

In an embodiment, the stored instructions are adapted to repeat steps a) to e) for each of a plurality of invoice images, wherein, after steps f) and g), the invoice upload file contains invoice data on a plurality of analyzed invoices in a format compatible with the accounting software of the payer, The stored instructions may perform any one or more of:
displaying the invoice upload file on a payer interface;
downloading the invoice upload file to a payer computer system; and converting the . invoice upload file into an XML request compatible with a webservices API operated by the accounting software of the payer.

In an embodiment, the required invoice fields include at least: a biller currency; a biller reference; and a payer reference.

The system may be adapted to analyses the invoice image file to identify the payer reference by first retrieving a payer reference pattern corresponding to the payer name from the client database and comparing the payer reference pattern with information found in the invoice image file to find a match.

The system may further store a supplier database in the memory and be adapted to analyse the invoice image file to identify the biller reference by first retrieving a biller reference pattern corresponding to the biller name from the supplier database and comparing the biller reference pattern with information found in the invoice image file to find a match.

In an embodiment, the memory further stores a bank rule database and wherein the instructions are further adapted to capture bank details from the analyzed invoice by performing the steps of:
A) identifying the biller country from address information contained in the invoice image;
B) retrieving from the bank rule database a set of required bank data fields corresponding to the biller country, the required bank data fields representing the fields banks located in the biller country must have to process bank transfer instructions;
C) identifying invoice data corresponding to each of the required bank data fields by further analyzing the image; and
D) storing the identified invoice data in an invoice record in the invoice database. In this embodiment, the stored instructions may be further adapted to perform the steps of:
generating a bank transfer instruction file compatible with banking software of the payer; and
writing into the bank transfer instruction file the identified invoice data corresponding to each of the required bank data fields.

The stored instructions may be adapted to:
repeat steps A) to D) for each of a plurality of invoice images,
generate a bank transfer instruction file compatible with banking software of the payer, and
write into the bank transfer instruction file the identified invoice data corresponding to each of the required bank data fields, such that the bank transfer instruction file contains invoice data on a plurality of analyzed invoices in a format compatible with the banking software of the payer.

The stored instructions may be further adapted to perform any one or more of:
displaying bank transfer instruction file on an interface for the payer to download;
downloading the bank transfer instruction file to a payer computer system; or converting the bank transfer instruction file into an XML request compatible with a webservices API operated by the banking software of the payer.

According to this aspect, there is also provided a computer-implemented invoice capture method, comprising:
a) receiving an invoice image containing invoice information;
b) identifying a payer name of a payer by analyzing the invoice image;
c) retrieving from the client database a list of required invoice fields corresponding to the payer name, wherein said required invoice fields represent a set of fields required by accounting software of the payer;
d) identifying invoice data corresponding to each of the required invoice fields by further analyzing the invoice image; and
e) storing the identified invoice data in an invoice record in an invoice database.

According to a third broad aspect of the present invention there is disclosed a computer-implemented invoice trading system including a processing computer having a central processing unit and a memory, the memory storing an exchange rate database and an invoice database, the invoice database including:

a plurality of client invoice records storing a client currency and a client invoice amount; and a plurality of supplier invoice records storing a supplier currency and a supplier invoice amount;

wherein the system is, configured, for each supplier invoice record where the supplier currency does not match the client currency, to:

a) convert the supplier amount in the supplier currency into a displayed invoice amount in the client currency using an exchange rate retrieved from the exchange rate database; and b) display the displayed invoice amounts of the supplier invoices on a user interface.

Preferably, the exchange rate is selected from:

the most recently-updated exchange rate in the exchange rate database; an exchange rate corresponding to an invoice date stored in the supplier invoice record; and a forward exchange rate calculated with reference to a planned payment date selected by a user.

More preferably, the exchange rate is further selected from one of:

a sell rate;

a buy rate; and a mid-market rate.

Preferably, the system is further configured to:

a) sum the invoice amounts of a plurality of client invoice records;

b) sum the displayed invoice amounts of a plurality of supplier invoice records; and c) calculate the difference between those two sums in the client invoice currency.

More preferably, the invoice trading system is further configured, for a selected group of client and supplier invoice records, to extract information comprising: a trade date; an invoice number; a biller name; and a payer name; and store the information in a file (such as a .csv file) in a banking file format.

Preferably, the system is further configured to, in response to a user selection of a plurality of client and supplier records, store a trade date and a trade reference in the selected client invoice records and store the trade date and the trade reference and the displayed invoice amount in the selected supplier invoice records.

In an embodiment, the system is further configured, for a selected group of client and supplier invoice records, to create a consolidated foreign exchange instruction by:

creating a buy and sell total in each currency;

cancelling any buy totals for a particular currency against any sell totals for that same currency, so that each currency has only a buy or sell total; and converting each remaining buy or sell total into a foreign exchange instruction compatible with a third party foreign exchange computer system.

In an example, wherein the consolidated foreign exchange instruction is created so as to include all of the remaining buy or sell totals, the consolidated foreign exchange instruction being compatible with a third party foreign exchange computer system. The stored instructions may be further adapted to perform any one or more of:

displaying the foreign exchange instruction on an interface for the client to download;

downloading the foreign exchange instruction to a client computer system; and converting the foreign exchange instruction into an XML request compatible with a webservices API operated by a third party foreign exchange provider.

According to this aspect, there is also provided a computer-implemented invoice trading method, comprising:

for each of a plurality of supplier invoice records where a respective supplier currency does not match a client currency:

a) converting the supplier amount in the supplier currency into a displayed invoice amount in the client currency using an exchange rate retrieved from an exchange rate database; and b) displaying the displayed invoice amounts of the supplier invoice records on a user interface.

According to a fourth broad aspect of the present invention there is disclosed a computer-implemented invoice access system, comprising:

a processing computer having a central processing unit and a memory, the memory storing an invoice database including a plurality of invoice records each storing at least one invoice number, a supplier database storing a plurality of supplier records each supplier record including at least one supplier domain, a client database storing a plurality of client records each client record A including at least one client domain, and stored instructions adapted to perform the steps of:

a) receiving from a user an invoice number and a user email address;

b) extracting a user email domain from the user email address;

c) searching the invoice database to identify a found invoice record corresponding to the invoice number received from the user;

d) retrieving from the found invoice record a found biller name and a found payer name corresponding to the invoice number received from the user;

e) searching the supplier database for both the found biller name and the found payer name and retrieving any found supplier domains corresponding to those biller or payer names;

f) searching the client database for both the found biller name and the found payer name and retrieving any found client domains corresponding to those biller or payer names; and g) when the user domain matches either the found client domain or the found supplier domain corresponding to the found invoice record, allowing the user to access the invoice record.

In an embodiment, wherein the step of allowing the user to access the invoice record includes any one or more of:

displaying at least some of the fields of the found invoice record on an interface accessible to the user;

downloading an invoice image stored in the found invoice record to a computer of the user;

downloading a copy of the found invoice record file (such as in .csv format); downloading a copy of the found invoice record in a file format compatible with accounting software of the user; and emailing an encrypted URL to the user, the encrypted URL being adapted to retrieve and display at least part of the invoice record when clicked by the user.

When the user is provided with access to the found invoice record, the user may simultaneously be provided access to any other found invoice records in the invoice database where the user domain matches either the supplier domain or the client domain corresponding to the biller or payer name of those further found invoice records.

In an embodiment, the user is allowed to access the found invoice record without having to provide a password. In an example, the user is allowed to access the further found invoice records without having to provide a password.

According to this aspect, there is also provided a computer-implemented invoice access method, comprising:
a) receiving from a user an invoice number and a user email address;
b) extracting a user email domain from the user email address;
c) searching an invoice database to identify a found invoice record corresponding to the invoice number received from the user;
d) retrieving from the found invoice record a found biller name and a found payer name corresponding to the invoice number received from the user;
e) searching the supplier database for both the found biller name and the found payer name and retrieving any found supplier domains corresponding to those biller or payer names;
f) searching the client database for both the found biller name and the found payer name and retrieving any found client domains corresponding to those biller or payer names; and
g) when the user domain matches either the found client domain or the found supplier domain corresponding to the found invoice record, allowing the user to access the invoice record.

According to a fifth broad aspect of the present invention there is disclosed a computer-implemented invoice payment system, comprising:
a processing computer having a central processing unit and a memory, the memory storing an invoice database including a plurality of invoice records each storing an invoice number a biller name and a biller country, a supplier database storing a plurality of supplier records each supplier record including a supplier country and supplier bank account information, a bank rule database including a plurality of bank instruction templates, and stored instructions adapted to perform the steps of:
a) receiving a plurality of selected invoice numbers for invoices payable to suppliers located in a plurality of countries;
b) searching the invoice database to identify a plurality of found invoice records corresponding to the selected invoice number;
c) retrieving from each of the found invoice records the corresponding biller names and biller countries of the suppliers that issued the respective invoices;
d) for each of the biller countries:
searching the bank rule database to identify a found bank instruction template corresponding to the biller country;
retrieving from the supplier database the bank account information corresponding to the respective biller name; and
storing the invoice number, invoice amount, supplier name, supplier country and supplier bank account information in a domestic bank transfer instruction file in a format dictated by the bank instruction template corresponding to the biller country.

In an embodiment, the system is adapted to generate a separate domestic bank transfer instruction file for each of the biller countries.

The system may be further adapted to create a single international bank transfer instruction corresponding to each billing country, such that the total of the invoice amounts in one of the domestic bank transfer instruction files is equal to the amount transferred in the international bank transfer instruction corresponding to that billing country.

In one embodiment, the system is further adapted to send the domestic bank transfer instruction file to a banking system located in a foreign country.

The system may be further adapted to send the international bank transfer instruction file to a banking system located in the user's home country.

In an embodiment, the international bank transfer instruction file is adapted to cause a local bank to wire funds a first foreign bank account, and the domestic bank transfer instruction is adapted to then cause a plurality of domestic transfers from the first foreign bank account into a plurality of bank accounts located in that same foreign country.

In various embodiments, the biller country:
i) is the United States of America and the domestic bank transfer instruction file is compatible with NACHA format;
ii) is located in the European Union and the domestic bank transfer instruction file is compatible with SEPA format;
iii) is Japan and the domestic bank transfer instruction file is compatible with EFT format;
iv) is Australia and the domestic bank transfer instruction file is compatible with EFT format; or
v) is Singapore and the domestic bank transfer instruction file is compatible with GIRO format.

According to this aspect, there is also provided a computer-implemented invoice payment method, comprising:
a) receiving a plurality of selected invoice numbers for invoices payable to suppliers located in a plurality of countries;
b) searching an invoice database to identify a plurality of found invoice records corresponding to the selected invoice number;
c) retrieving from each of the found invoice records the corresponding biller names and biller countries of the suppliers that issued the respective invoices;
d) for each of the biller countries:
searching a bank rule database to identify found bank instruction template corresponding to the biller country;
retrieving from a supplier database bank account information corresponding to the respective biller name; and
storing the invoice number, invoice amount, supplier name, supplier country and supplier bank account information in a domestic bank transfer instruction file in a format dictated by the bank instruction template corresponding to the biller country.

The present invention also provides computer software configured to, when executed by a computing device, implement the method of any one of the above aspects of the invention.

The present invention also provides a computer readable medium (such as a tangible and/or non-transitory computer readable medium), comprising such computer software.

It should be noted that any of the various individual features of each of the above aspects of the invention, and any of the various individual features of the embodiments described herein including in the claims, can be combined as suitable and desired

BRIEF DESCRIPTION OF THE DRAWINGS

In order that the invention may be more clearly ascertained, embodiments will now be described, by way of example only, with reference to the accompanying drawings in which:

FIG. 3A is a screen shot of an invoice inbox page according to an embodiment of the invention of the user interface of the computer-implemented invoice capture system of FIG. 2;

FIG. 10 is a screen shot of a trade file according to an embodiment of the invention;

FIG. 11 is a screen shot of a history page according to an embodiment of the invention;

DETAILED DESCRIPTION

In the description and claims use is made of the term "invoice" to indicate a bill issued from a biller to a payer in relation to services provided in one or more intellectual/industrial property matters. It will be appreciated that, unless the context clearly indicates otherwise, this term "invoice" is intended to also cover any monetary instrument exchange between companies, individuals and firms in any field of endeavor.

In the description and claims the terms "intellectual property" and; "industrial property" are used interchangeably and both are abbreviated with the term "IP".

Figure 1:
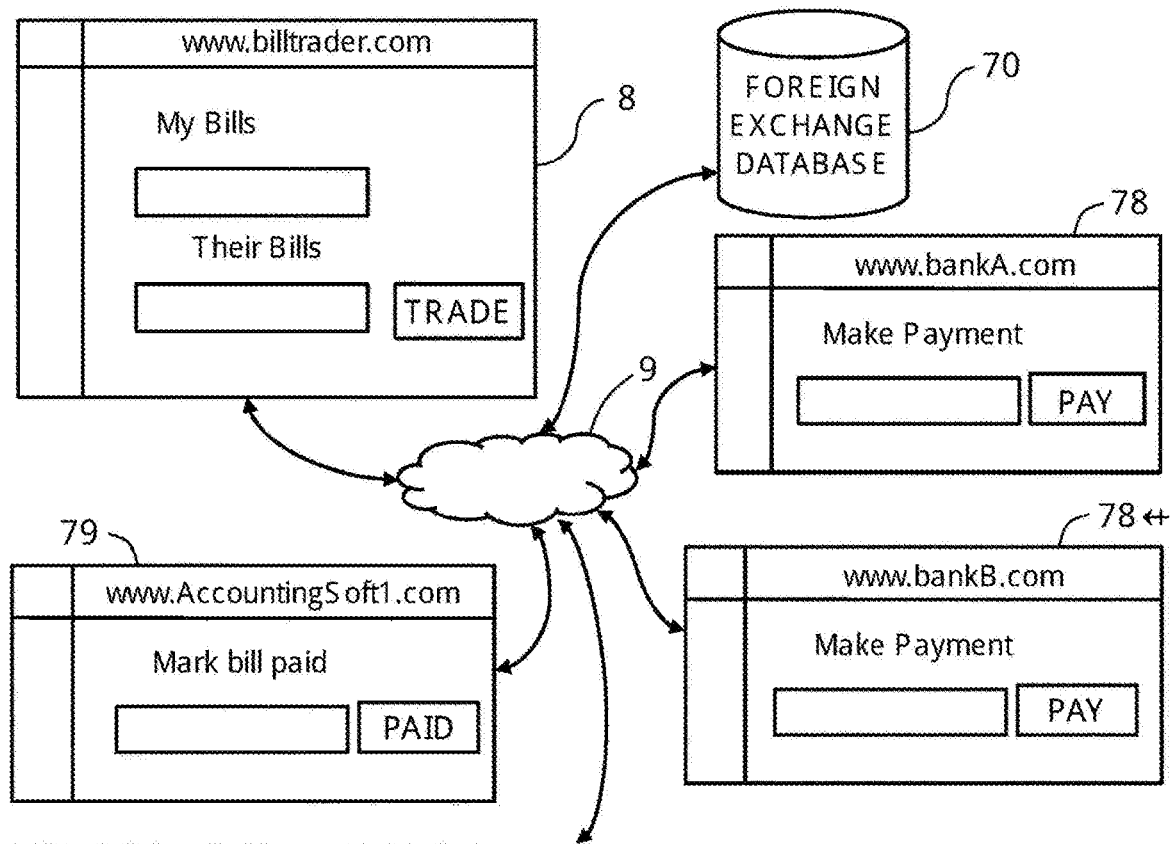
FIG. 1 is a block diagram of the computer-implemented multi-currency invoice. capture, trading, access and payment system according to an embodiment of the invention.
Figure 1:
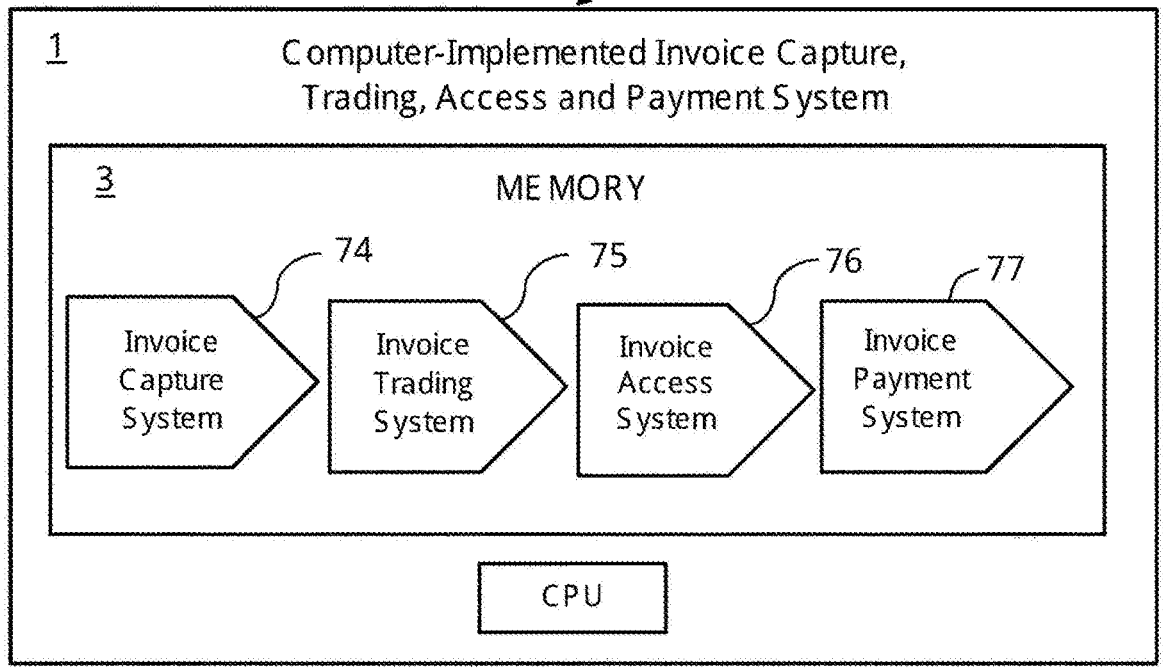

As shown in FIG. 1, a computer-implemented multi-currency invoice capture, trading, access and payment system 1 of an embodiment of the present invention includes a central processing unit 2 and a computer-readable storage medium in the form of a memory 3. The memory 3 includes three subsystems which may be stored separately or in combination. These three subsystems are an invoice capture system 74, which is described in greater detail with reference to FIGS. 2 to 4, an invoice trading system 75, which is described with reference to FIGS. 5 to 12, an invoice access system 76, which is described with reference to FIGS. 18A to 13C and 14 and an invoice payment system 77 which is described with reference to FIGS. 15 and 16.

The system 1 of the present embodiment is in communication with a user interface 8, such as the billtrader.com website, via a network 9, such as the internet. The system is further in communication with a foreign exchange database 70, a plurality of banking systems 78 and 78' and a user's accounting software package 79.

In a first embodiment the interface 8 is located on the same server as the invoicing system 1. In a second embodiment, the interface 8 is located remotely from the computer system 1 and is accessed via the network 9.

Figure 2:
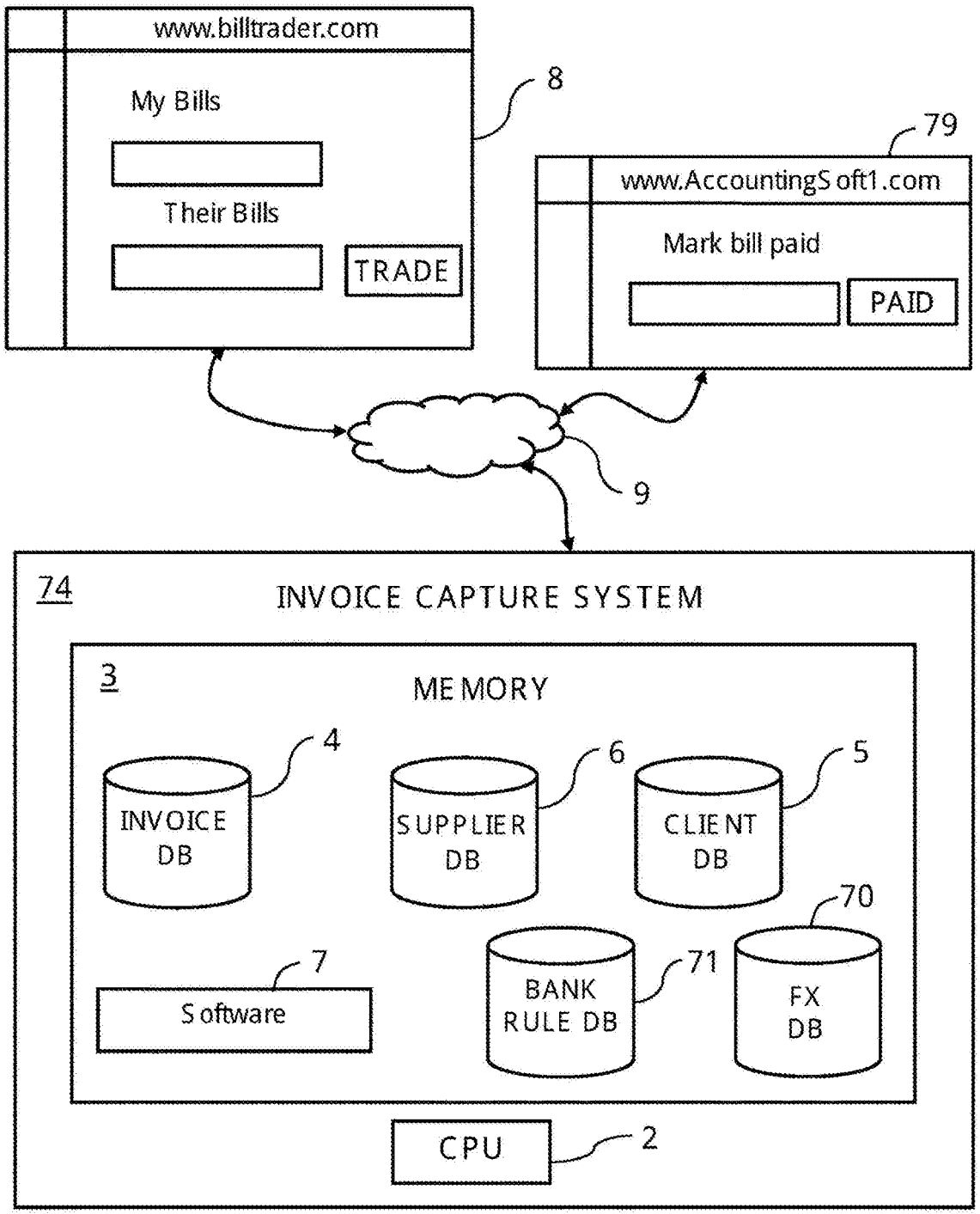
FIG. 2 is a block diagram of the computer-implemented invoice capture system according to an embodiment of the invention.

Turning now to FIG. 2 there is shown the computer-implemented invoice capture system 74 of an embodiment of the present invention includes a central processing unit 2 and a computer-readable storage medium in the form of a memory 3. The memory includes an invoice database 4, a client database 5, a supplier database 6, an exchange rate database 70, and program instructions in the form of software 7 stored thereon. The invoice capture system 74 is in communication with a user interface 8, such as a website, via a network 9, such as the internet. The system 74 is further in communication with a user's accounting software 79 via the network 9.

Figure 6:
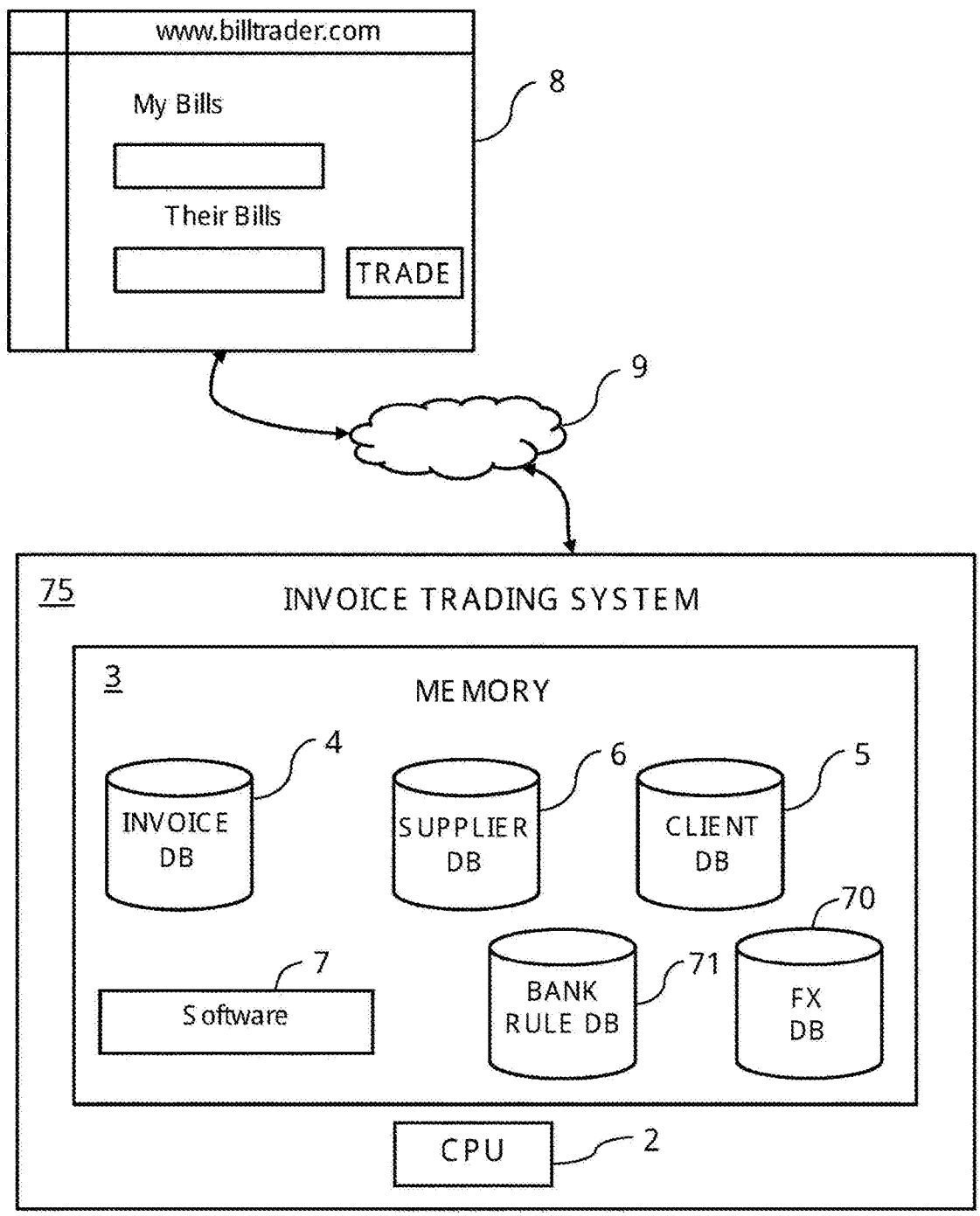
FIG. 6 is a block diagram of the computer-implemented invoice trading system according to an embodiment of the invention.
Figure 13A:
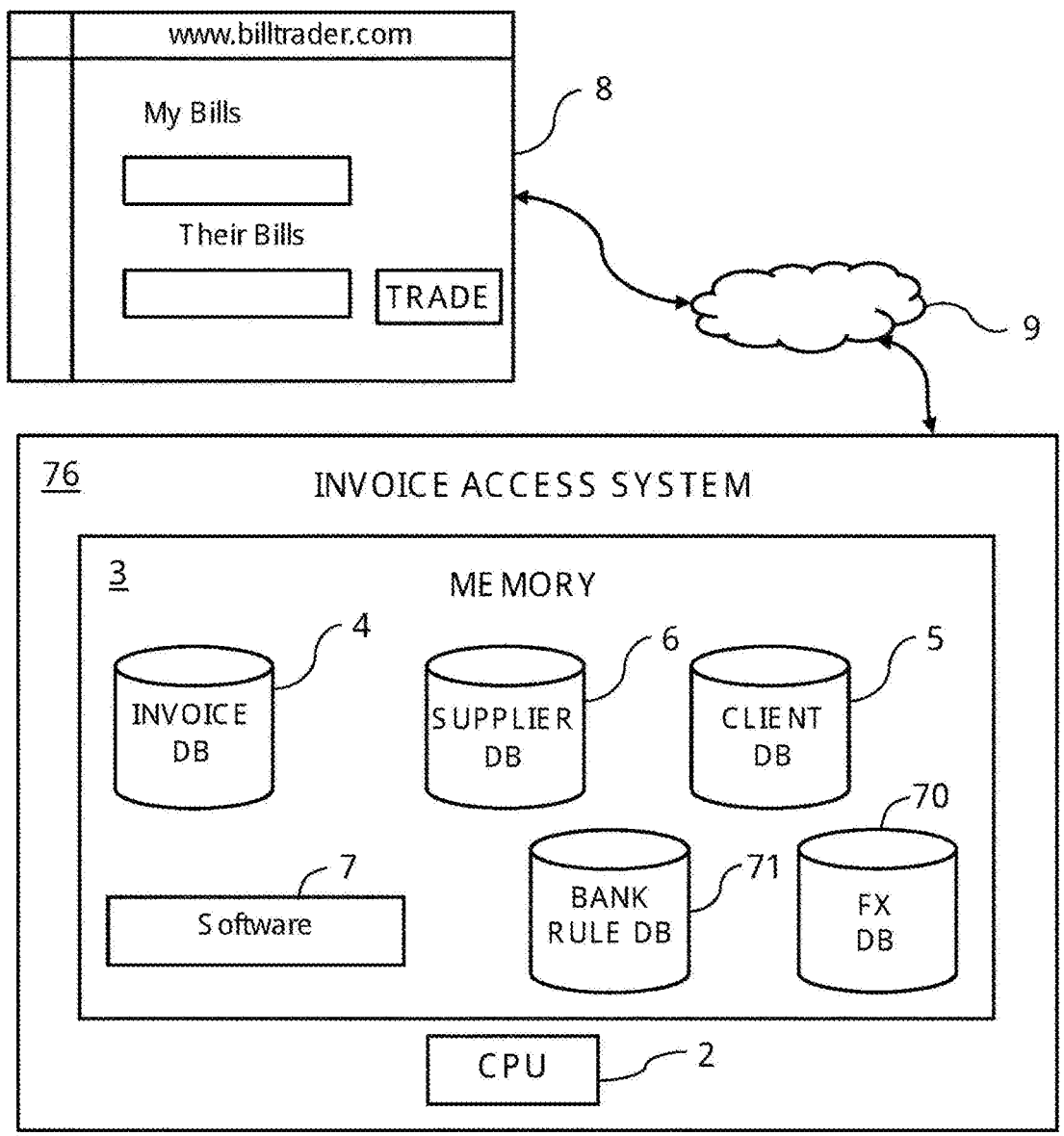
FIG. 13A is a block diagram of the invoice access system according to an embodiment of the invention.
Figure 15:
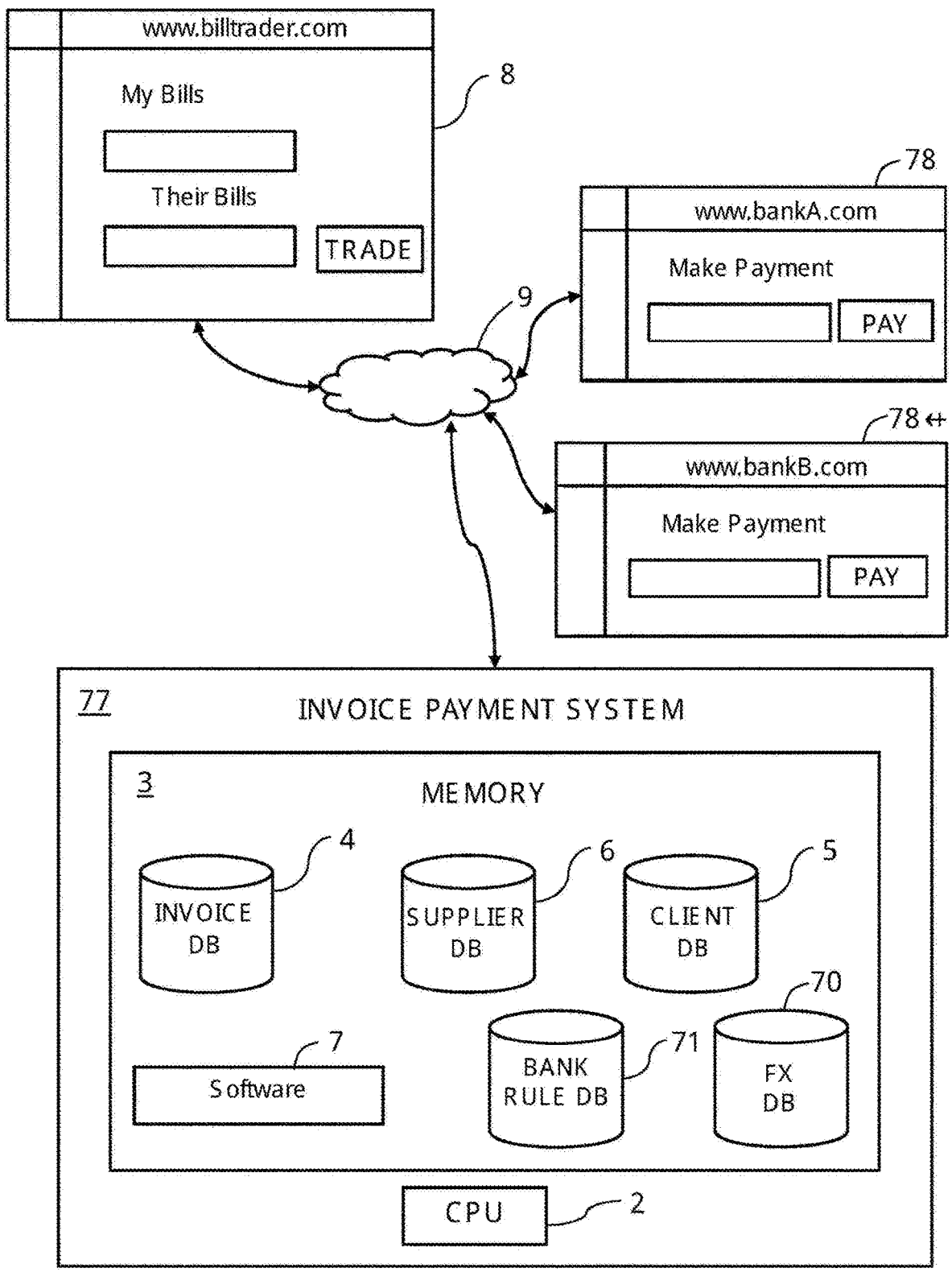
FIG. 15 is a block diagram of the computer-implemented invoice payment system according to an embodiment of the invention.

It should be noted from a comparison between system 74 and the system of FIG. 1, and indeed of FIGS. 6, 13A and 15, that—for convenience—like reference numerals have been used to identify like components. It should be understood, however, that the various components, even if identified by like reference numerals, will generally be provided as distinct elements. Notwithstanding this, in some cases it may be convenient or advantageous to provide certain components in integrated form. For example, it will be appreciated that memory 3 of invoice capture system 74 may be housed in or be provided as a portion of memory 3 of invoice capture, trading, access and payment system 1.

Returning to FIG. 2, in a first embodiment the interface 8 of system 74 is located on the same server as the invoice capture system 74. In a second embodiment, the interface 8 is located remotely from the invoice capture system 74 and is accessed via the network 9.

In one embodiment, the CPU of the invoice capture system 74 is the same CPU as that of the invoice capture, trading, access and payment system 1.

In an alternative embodiment, they have plural but shared CPUs and, in another embodiment, separate CPUs. Similarly, as discussed above, in one embodiment the memory of the invoice capture system 74 is the same memory as that of the invoice capture, trading, access and payment system 1. In an alternative embodiment, they are separate memories. In one embodiment the foreign exchange database 70 is located within the invoice capture system's memory 74. In an alternative embodiment the foreign exchange database 70 is located remotely and the invoice capture system 74 accesses that database via a network 9, such as the internet.

Figure 3A:
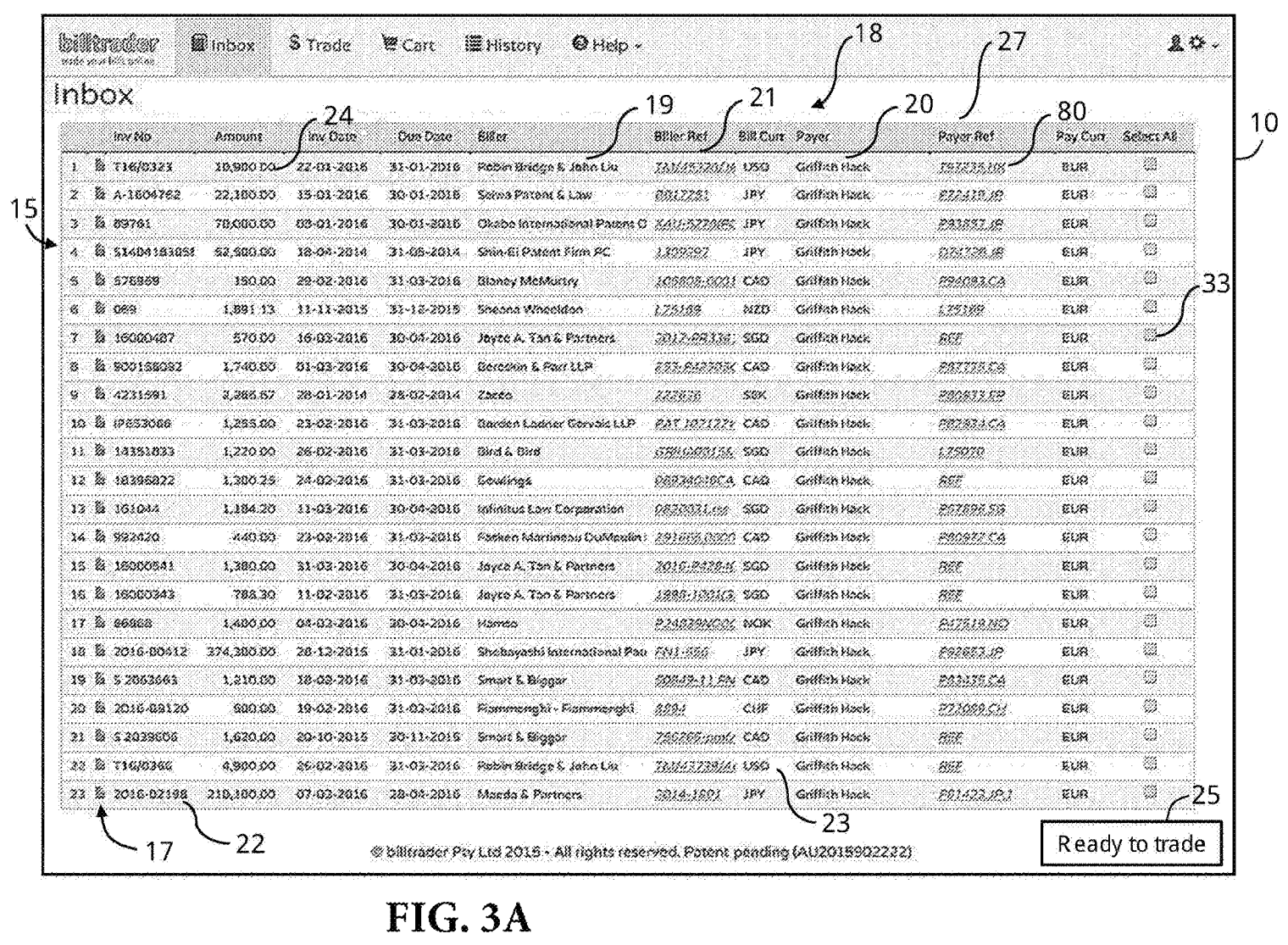
Figure 3B:
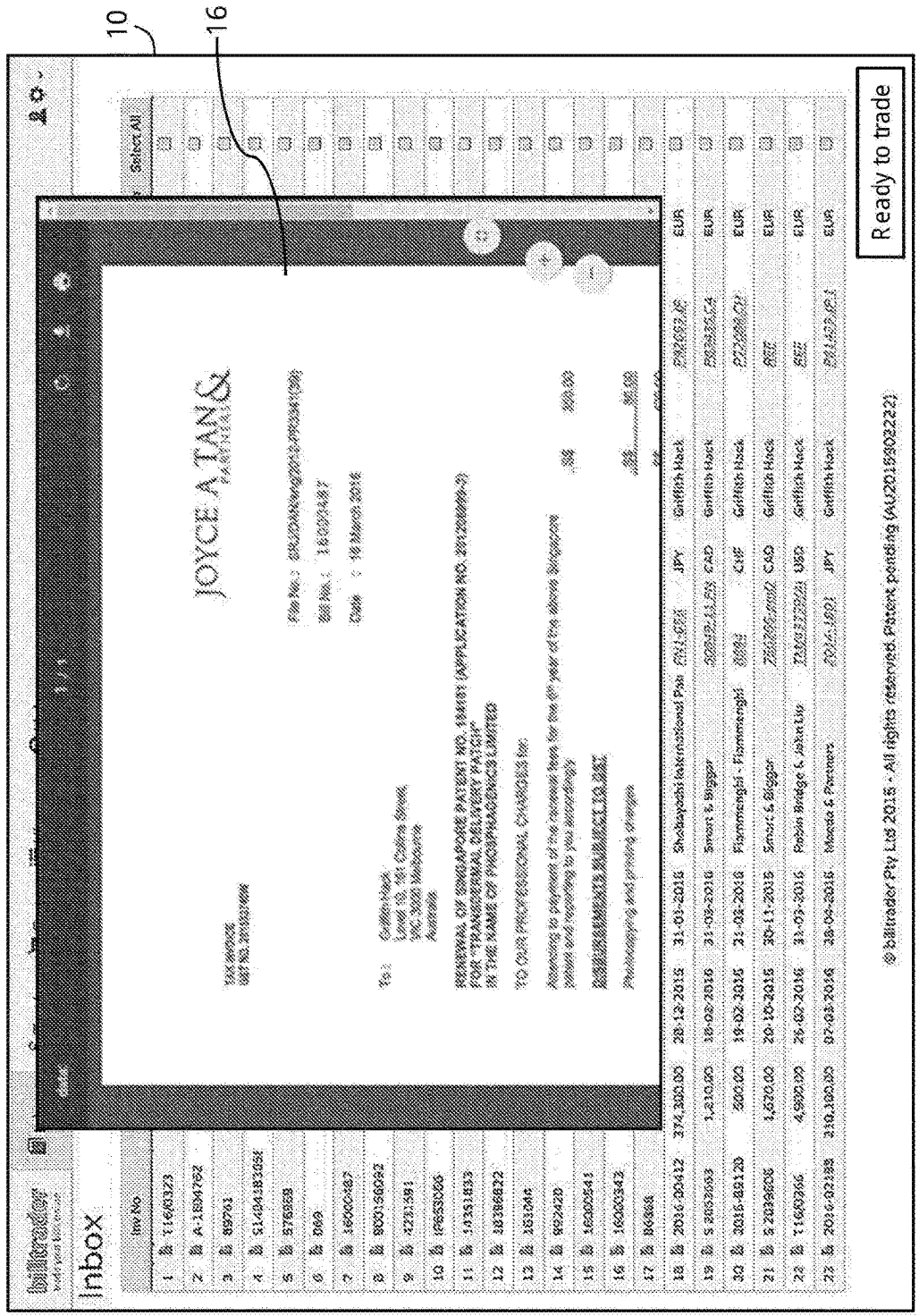
FIG. 3B is a screen shot of an exemplary invoice image superimposed on the invoice inbox page of the user interface of FIG. 3A.

Turning to FIG. 3A there is shown a screen shot of a preferred embodiment of an invoice inbox page 10 of the user interface 8. In order for an invoice record 11 to appear in the inbox 10 it goes through a number of steps. Firstly, a user emails an image 16 (see, for example, invoice image 16 of FIG. 3B) of a physical invoice 12 (not shown) to a central email address such as mail@billtrader.com. The invoice image 16 is preferably in PDF or JPEG format but may also be in a word processor or other formats.

Upon receiving the emailed invoice from the user, the system 74 accesses the client database 5 to identify a client record 13 corresponding to the email address the email was received from. The client record 13 includes a number of pieces of information about the client, which is typically a patent attorney firm. For the sake of simplicity, we shall refer to a client as an Australian patent firm and a supplier as a foreign patent firm (i.e. a patent firm located in a different jurisdiction). However, it will be understood by those skilled in the art that clients and service providers can be located in any country and may not be patent attorney firms.

The client record 13 includes at least the client's name, the currency in which the client issue invoices, the domain name included in their email addresses and a dedicated invoice email address 14. Upon receipt of the email from the client the system reroutes the email to the dedicated invoice email address 14 associated with that client. Once the email has been received at that dedicated invoice email address 14, the system stores a copy of the invoice image 16 in its invoice database 4 and displays a link 17 to the invoice image 16 adjacent to the invoice number in an "Inv. No." column within the invoice inbox 15 on the invoice inbox page 10 of the user interface 8. It should be noted that user interface 8 may also provide a link 17 corresponding to a specific invoice by displaying the relevant invoice number as a hyperlink, such that selection of the hyperlink will prompt the system to display the corresponding invoice image 16. This is so in, for example, trading page 36 of FIG. 7 (described below).

In an alternative embodiment the system 74 does not identify the client from the email address the invoice came from, but by analyzing the biller name 19 or payer name 20 from the invoice itself and matching that name with a client name stored in the client database 5.

Once the email has been received in the inbox 15, the system 74 performs an analysis on the invoice image 16 to retrieve key invoice information 18 and store it in the invoice database 4. The analysis typically involves parsing the invoice image and, based upon the form of text found (e.g. letters, number), keywords (e.g. "invoice No." date) and the position of the information on the page (e.g. totals are typically found towards the bottom of the page) identifying the key information 18, storing it in the invoice database 4 and displaying it within the editable columns 27 of the invoice inbox 15. The key information 18 includes the biller name 19 (i.e. the person/firm that issued the invoice and is due to be paid), the payer name 20 (i.e. the person/firm who owes the money to the biller), the biller's reference 21, the invoice number 22, the currency 23 the invoice was issued in and the amount 24 of the invoice.

Figures 4, 5:
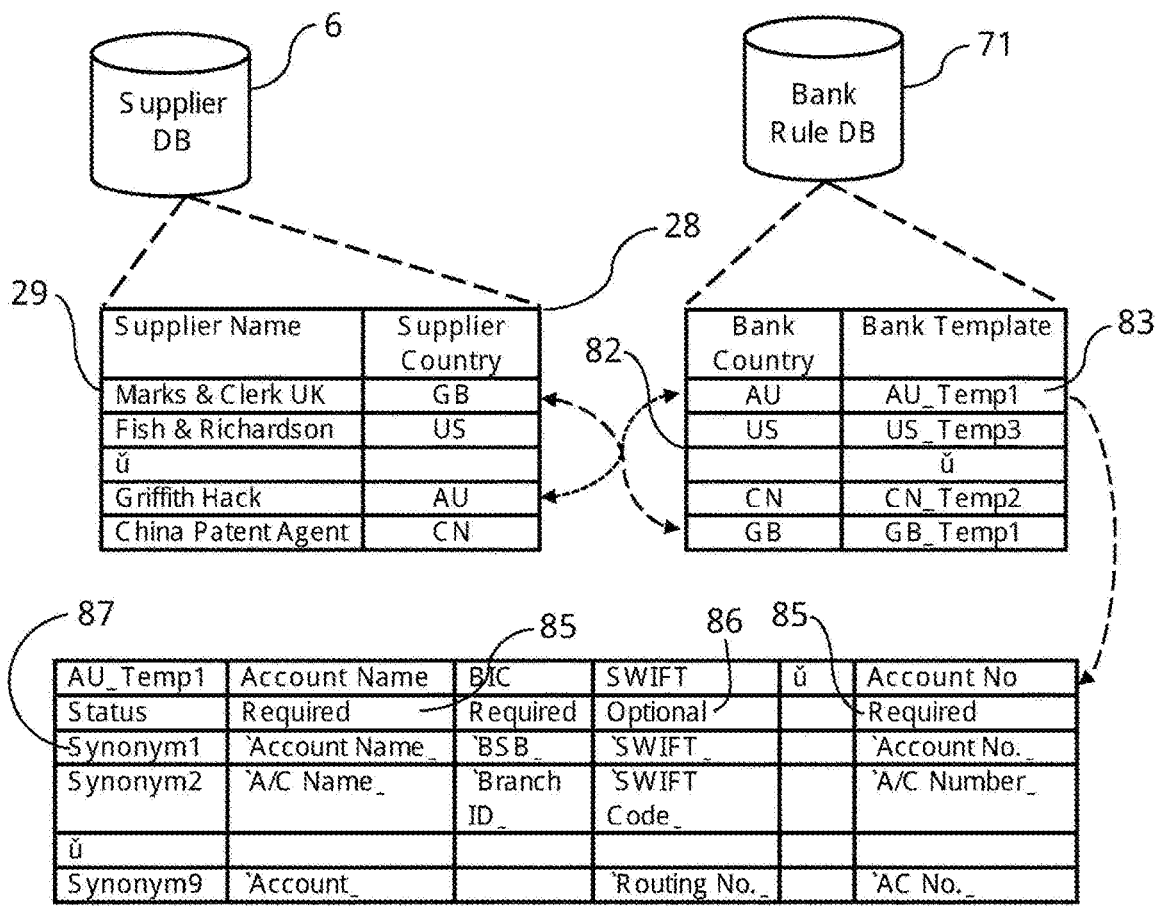
FIG. 4 is a block diagram of the bank detail template capture portion of the invoice capture system according to an embodiment of the invention.
FIG. 5 is a diagram of the computer-implemented invoice trading system according to an embodiment of the invention.

As shown in FIG. 4, the biller's reference 21 and the payer's reference 80 is may be ascertained with reference to a set of synonym tables 81. The synonym tables 81 are dynamically populated tables that learn synonyms used in each country for a biller or payer reference; these synonyms are stored in order of country. As shown, in the United States, United Kingdom and Australia, one synonym for the biller's reference 21 is "My ref". Another in Australia is "matter number". The synonym tables 81 are used as part of the invoice parsing process to correctly capture both the biller reference 21 and the payer reference 80, which are both needed to correctly capture the invoice details into the user's accounting software package 79.

In a preferred embodiment, the client database 5 also includes a "my reference" pattern 88 corresponding to the format that particular client firm uses for indicating its own matter numbers. For example, a firm may start their reference with an indicator of the type of intellectual property involved (e.g. P for patents T for trademarks) followed by a set number of digits (e.g. NNNNNN) followed by the initials of the partner involved (e.g. LLL). When the pattern of a client/supplier is known, the system 74 is able to much more accurately extract the biller reference 21 and payer reference 80 from the invoice image 16.

In the preferred embodiment the invoice capture system 74 reviews the captured key invoice information 18 as part of the data validation process and compares it to the known information, such as previously captured bank information for a particular supplier or the reference pattern of a particular client or supplier. By making use of this known information the process of extracting data from the invoices and validating it becomes more accurate.

In this preferred embodiment the user has the ability to edit the automatically-generated key information 18 before saving it to the invoice database 4 by clicking the ready to trade button 25. In addition, users can upload additional invoice images 16 directly into the invoice inbox 15 using the upload button 26 (not shown).

If the upload button 26 is used, the system automatically performs the analysis described above to identify the key invoice information 18 and display it in the editable columns 27 of the invoice inbox 15.

Once the analysis has been performed and the key invoice information 18 has been identified, the system 1 performs a further validation step. The client database 5 shown in FIG. 2 contains, in its client records 13, a complete list of all the patent attorney firms that are clients of the company operating the invoicing system, in this example BillTrader (trademark). Each of these patent firm clients typically does business with a known list of foreign patent attorney firms. These foreign patent attorneys, referred to herein as "suppliers", are contained in a plurality of supplier records 28 in the supplier database 6. Each supplier record 28 contains at least the supplier name 29, supplier currency 30 (i.e. the currency that supplier generates invoices in) and pairing information 31 which associates a particular client record 13 with a particular supplier record 28. This pairing represents a complete list of client-supplier relationships. For example, a single Australian patent firm may exchange work with three different Chinese patent firms. The pairing information would indicate the client-supplier relationship between those four parties.

Because it is difficult for computers to accurately recognize images and turn them into words, particularly when poor-quality scans are used, and because the way in which a patent firm's name is written may be different on the invoice from the supplier name 29 stored in the supplier database 6, the validation step is performed to automatically correct that information. In the validation step, the biller name 19 is first compared with the client name 32 corresponding to the client user, in this example an Australian patent firm called "Simpson Attorneys." Fuzzy logic is used in this comparison so that names that are similar, but not identical, can nonetheless be matched. For example, if the invoice image 16 had "Simpson Attys" as the biller name, the system would match that phrase to the accurate client name 32 of "Simpson Attorneys" stored in the client database 6. In the event of the fuzzy match, the system overwrites the inaccurate or approximate name "Simpson Attys" with the correct biller name "Simpson Attorneys" and stores it in the biller name 19 field of the invoice record 11.

Similarly, the validation step also involves ensuring that the supplier names are correct by identifying the set of paired suppliers corresponding to Simpson Attorneys and comparing that list of names with the biller names 19 and payer names 20 found on the invoices. Again, fuzzy logic is used so that similar but not exact names are matched. Once a fuzzy match is achieved the biller name 19 and payer name 20 in the invoice record 11 are overwritten with the correct form of those names as stored in the supplier name 29 fields of the supplier records 28 in the supplier database 6.

At the end of this validation stage all of the biller 19 and payer names 20 shown in the invoice inbox 15 correspond exactly to either client names 32 or supplier names 29 in the client 5 and supplier 6 databases respectively.

By performing this validation step, human interaction/checking is minimized, and the data is automatically cleaned, thereby allowing seamless integration with the user's accounting software 79. It also minimizes the effort needed to review and correct the way in which client and supplier names are written by the accounting departments of the foreign patent firms. By automating the extraction of key information, then validating that key information, the present invoicing system is substantially more efficient than traditional means.

Although not shown in the screen shot of FIG. 3A, in the background the invoice capture system 74 is also capturing bank account information from the invoice image 16, as shown in FIG. 5.

Turning to FIG. 5, within the supplier database 6, there are stored a plurality of supplier records 28, each containing a supplier name 29 and supplier country 81, indicating the country the supplier is located in. As banking rules differ from country to country and the information required for a bank transfer in country A differs from that in country B, the system 74 cross-references the supplier country 81 with a bank country 82 stored in the bank rule database 71. For each bank country 82 there is stored in the bank rule database 71 a bank account template 83 which stores the different fields that banks in that country require when performing bank transfers. For example, some countries require a BIC code, others require a BSB, others require a SWIFT code, and so on. Almost every country has different bank account nomenclature. The bank account database 71 stores all of the templates 83 for the major countries and references that template when extracting the supplier's bank information 84 from the invoice image 16.

FIG. 5 shows an example template AU_Temp1, which is the template for Australia. The template includes a number of required bank fields 85, optional bank fields 86 and bank field synonyms 87. When extracting the supplier's bank information 84, the invoice capture system 74 will look for the required bank fields 86 within the invoice by making use of the synonyms 87 which help identify the field. For example, for an invoice issued by an Australian supplier, the required BIC (bank identification code) in Australia, is called a "BSB" number, so the system searches for the string "BSB" instead of BIC and stores the string that follows "BSB" as the BIC field.

Returning to FIG. 3A there is also shown a series of selectable checkboxes 33 that allow the user to select the bills that he or she wishes to trade.

When the ready to trade button 25 is pressed, the system responds by updating the invoice records 11 with the information appearing on the invoice inbox 15 into the invoice database 4 in the system's memory. In addition, each invoice record 11 includes a status 35. When the update button 34 is clicked the invoice status 35 changes from "Pending" to "Ready to trade".

In a preferred embodiment, when the selected invoices are ready to trade, an invoice upload file 89 is also created. The invoice upload file 89 is a file in a format that is compatible with the user's accounting software 79.

In its preferred form, the system 74—once it has analyzed an invoice image 16 to identify the payer's name 20—looks up the client database 5 and retrieves a list of required invoice fields corresponding to the payer name 20. The required invoice fields represent a set of fields which are required by the payer's accounting software 79, such as Aderant Expert (trademark) or InProtech (trade mark). The system 74 then captures the key information 18 from the invoice image 16, capturing information corresponding to those required invoice fields, and then stores the information in the invoice records in the invoice database 4.

Figure 12:
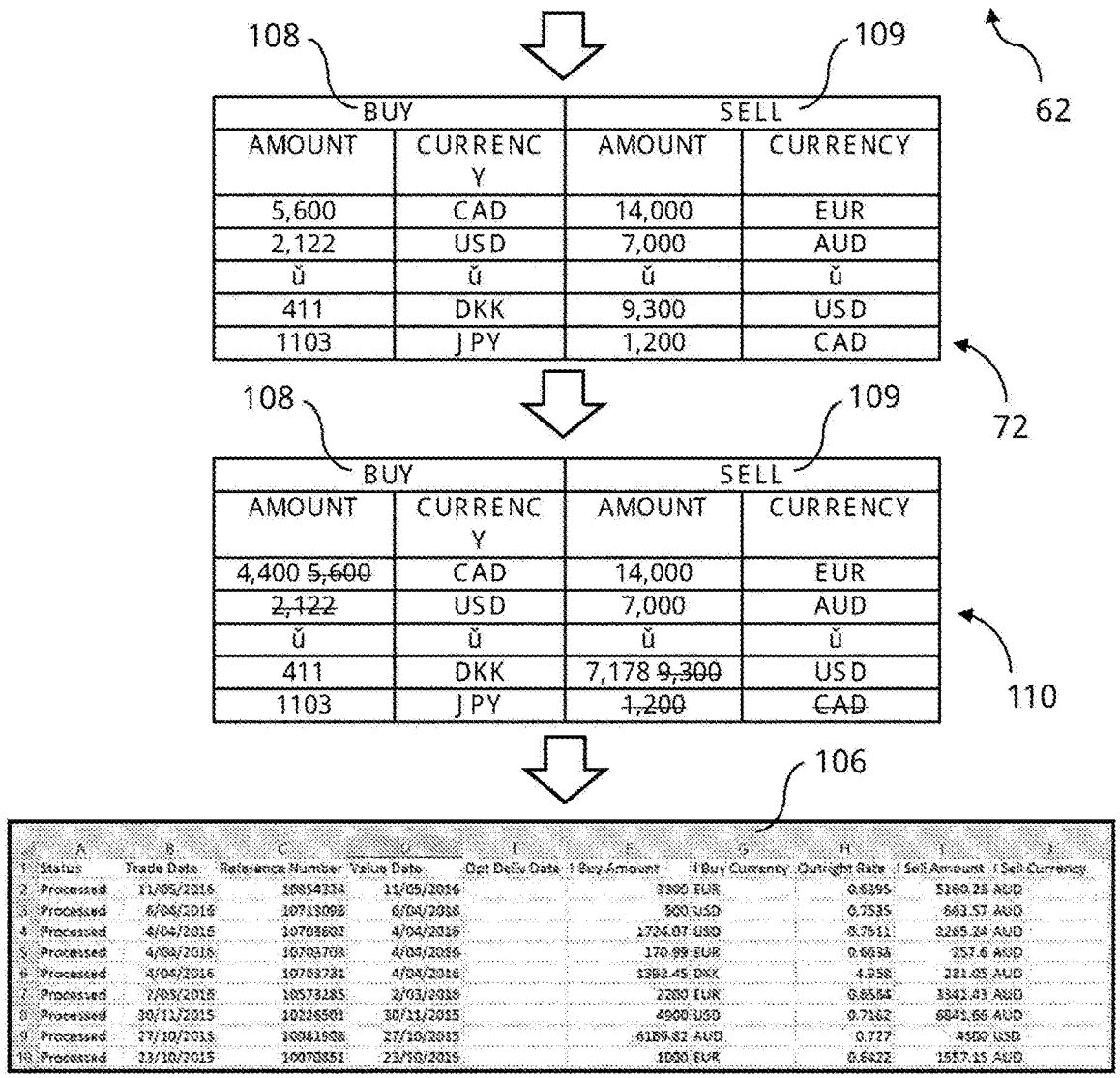
FIG. 12 is a block diagram of the automated trading instruction generator according to an embodiment of the invention.

In a preferred form, when the user clicks the "ready to trade" button 25 the system generates an invoice upload file 91 similar to the trade file 62 shown in Figure 12. The invoice upload file 91 is configured to be compatible with the payer's accounting software 79 and includes key information extracted from the invoice image 16 corresponding to each of the required invoice fields.

In the preferred embodiment, upon clicking the "ready to trade" 25 button the invoice upload file 91 is automatically downloaded to the user's computer system. The user can then use that file to upload the invoice data into their accounting software 79 without having to manually enter all of the information from those supplier invoices. By cross-referencing the user's accounting software format at the information capture stage, the system 74 ensures compatibility between itself and the user's accounting software 79.

In an alternative embodiment, the invoice upload file information 91 is displayed on the user interface 8, such as the BillTrader website. In a further alternative, the system 74 communicates directly with the user's accounting software 79 via a webservices, or similar API. In such an embodiment the system converts the invoice upload file into an XML request compatible with a webservices API operated by the users accounting software. The user's accounting software can then receive the webservice request that contains all of the key invoice information that was automatically captured by the system 74 and upload it into its own database. In this way the automated capture of the invoice data is achieved in a manner which ensures compatibility with the user's accounting software.

Figure 7:
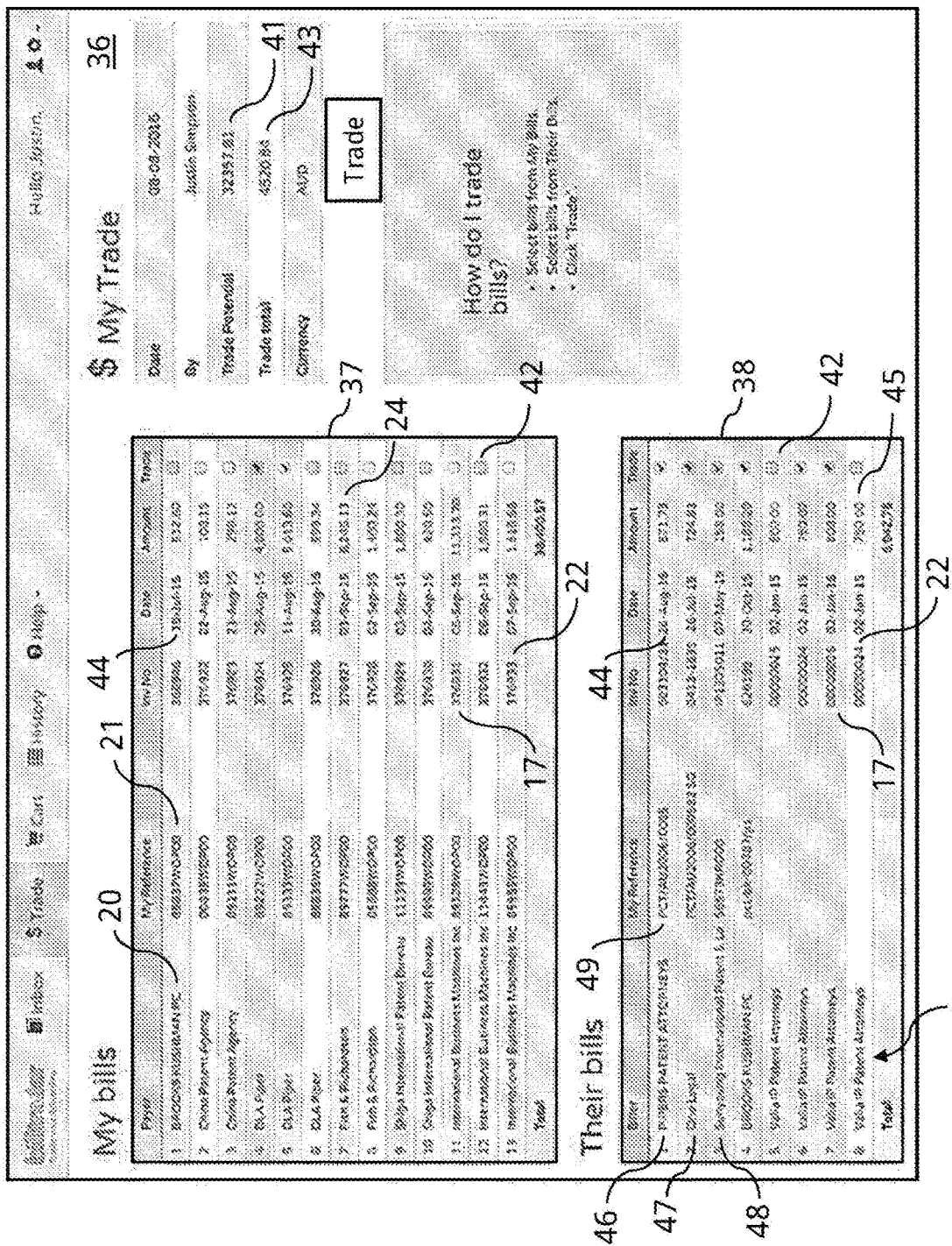
FIG. 7 is a screen shot of a trading page according to an embodiment of the invention.

Invoice records 11 having the status "Ready to trade" appear on the trading page 36 shown in FIG. 7.

Turning firstly to FIG. 6 there is shown a block diagram of the computer-implemented invoice trading system 75 according to an embodiment of the invention. The invoice trading system 75 includes a central processing unit 2 and a computer-readable storage medium in the form of a memory 3. The memory includes an invoice database 4, a client database 5, a supplier database 6, an exchange rate database 70, and program instructions in the form of software 7 stored thereon. The invoice trading system 75 is adapted to communicate with a user interface 8, such as a website, via a network 9, such as the internet.

Turning now to FIG. 7, there is shown a screen shot of a trading page 36 according to an embodiment of the invoice trading system 75. The trading page 36 includes a "My bills" section 37, a "Their bills" section 38 and a trading summary section 39.

In order to populate the My bills section 37, the system searches the invoice database 4 for invoices corresponding to the client name 32 of the user where the invoice status 35 is "Ready to trade" and the payment status 40 is "Unpaid." A sum of all such invoices is calculated by the system 75 and displayed as the invoice total 41. A set of selectable trading checkboxes 42 is displayed alongside each invoice record 11 shown. When selected, a trading total 43 is updated with the sum of the amounts of the corresponding selected invoices.

The My bills section 37 shows a number of the fields of the invoice record including the payer name 20, the biller reference 21, the invoice date 44, the invoice number 22, the link 17 to the invoice image 16 and the invoice amount 24. Note that in the My bills section 37 the invoices are shown in the user's preferred currency (i.e. the client currency), which in this example is Australian dollars.

When the trading checkboxes 42 are checked, the trading total 43 is updated in the My bills section 37. This trading total 43 is the amount of money the user is owed by foreign patent firms. This amount is available to trade against invoices they have received from foreign patent firms, shown in the Their bills section 38.

The Their bills section 38 operates in a similar way to the My bills section with the exception of how currency is handled. As shown, all of the displayed invoice amounts 45 of these invoices received from suppliers are shown in Australian dollars (i.e. the client currency). Whilst the invoice currencies of these invoices are not shown, the PIPERS Patent Attorneys invoice record 46 has an invoice currency 25 of New Zealand dollars, the OneLegal invoice record 47 has an invoice currency 25 of Singapore dollars and the SunYoung invoice record 48 has an invoice currency 25 of Korean Won.

In a preferred embodiment, the system 75 calculates the displayed invoice amount 45 with reference to the exchange rate database 70 which stores buy exchange rates 53, sell exchange rates 54 and mid-market exchange rates 55 in both real time and on an historical basis (e.g. the average buy, sell and mid-market rates for a particular day in the past).

In one embodiment the displayed invoice amount 45 in Australian dollars is calculated from the invoice amount 24 of the PIPERS invoice record 46 in New Zealand dollars using the real time sell-side exchange rate 54. In this embodiment the displayed invoice amount 45 is updated as often as the exchange rate database 70 is updated by an exchange rate feed 52 from a foreign exchange information provider and only becomes fixed when the user clicks the trade button 51.

In another embodiment the displayed invoice amount 45 in Australian dollars is calculated from the invoice amount 24 of the PIPERS invoice record 46 in New Zealand dollars using the historical sell-side exchange rate 54 as at the invoice date 44 which, in this case, is 16 Jun. 2015.

In a further embodiment, the displayed invoice amount 45 is calculated with reference to a forward exchange rate 56 established between the system operator (in this case BillTrader) and the foreign exchange information provider, that fixes the exchange rate for a given period of time. On the trading cart page 57 shown in FIGS. 8A and 8B on the right hand side are shown a radio button 93 entitled "pay now" or "pay later". The pay later option triggers the system to use a forward exchange rate corresponding to an agreed payment schedule established with the client (e.g. in 90 days). The "pay now" option uses the current exchange rate or an exchange rate agreed to be paid within a short number of days. This option gives the client the ability to use the system as simply a payment service (pay now) or as a tool to hedge the exchange rate in respect of supplier invoices it is yet to charge to its clients and collect the funds for. By choosing "pay later" the user can lock in a fixed AUD value for their supplier invoices, then take a couple of months to collect those exact AUD funds from their local client before then paying the system operator (in this case BillTrader) the AUD total by the 90 day agreed deadline. By fixing the exchange rate in this manner for 90 days the user patent firm protects itself against currency fluctuations that may occur between the date they pass on their agent's invoice to their local client and the date they pay their foreign agent.

Further embodiments involve the system 1 calculating the displayed invoice amount 45 with reference to the buy side exchange rate 53, the sell side exchange rate 54 or the mid-market exchange rate 55 either in real time or based on historical daily averages.

In the trading summary section 39 is displayed the result of a calculation performed by the system in which the Their bills trading total 43' is subtracted from the My bills trading total 43 to calculate the trading difference 50, which in this case is AU$4,520.84.

Conceptually, the user is selecting a number of its own invoices that it wishes to trade against the invoices it has received from its foreign attorney suppliers. Hence the difference is the amount that the invoice system operator, in this case BillTrader, will pay to the client once the trade takes place.

Figure 8A:
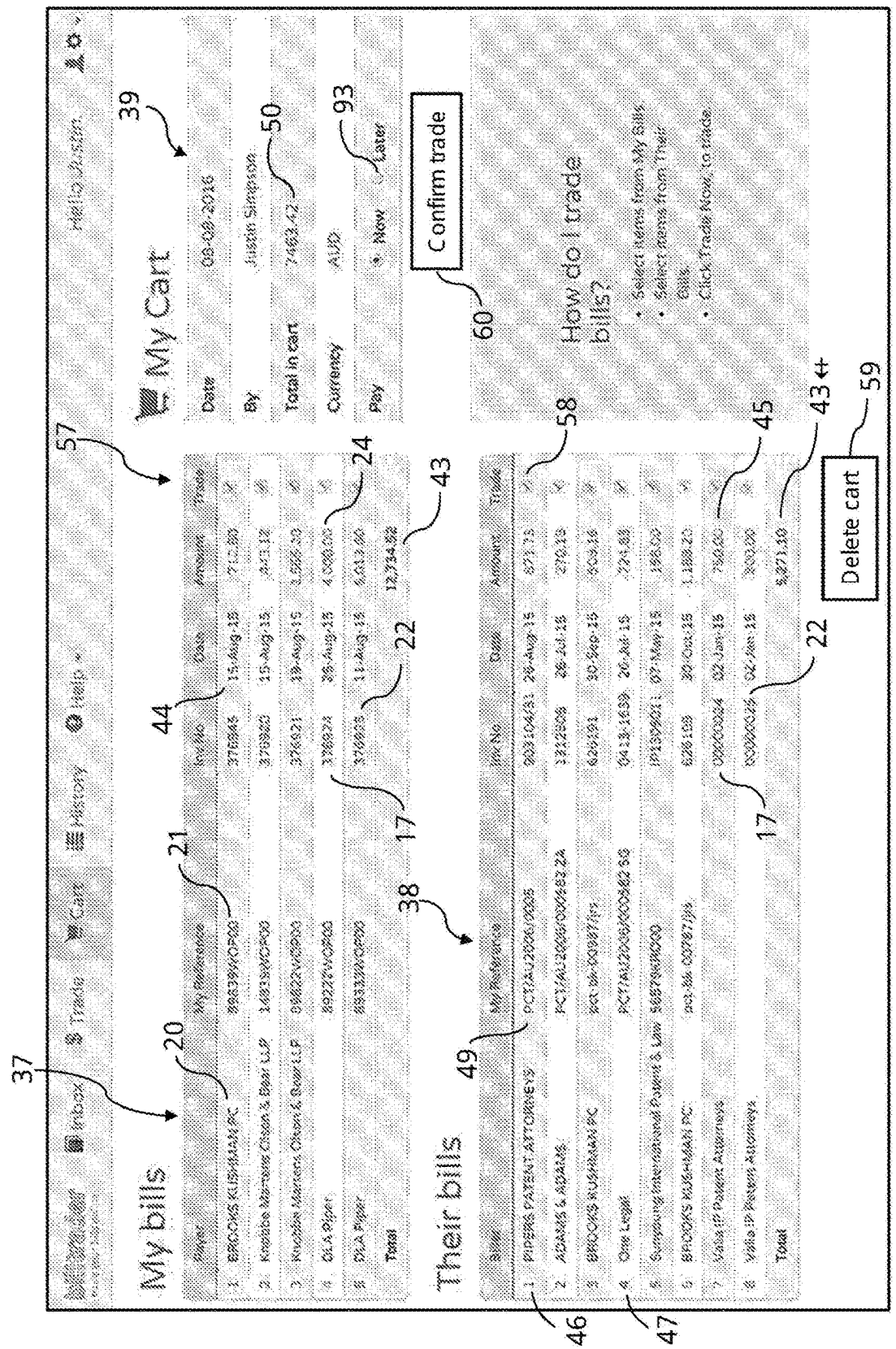
FIGS. 8A and 8B are screen shots of a trading cart page according to an embodiment of the invention.

Once the user clicks the trade button 51, the invoicing system 1 displays a trading cart page 57 on the user interface 8. As shown in FIG. 8A, the trading cart page 57 looks similar to the trading page 36 but a filter has been applied so that there are displayed only those invoices that had their trading checkboxes 42 selected. Again the page is divided into a My bills section 37, a Their bills section 38 and a trading summary section 39.

Like a traditional website shopping cart this page allows the user to confirm their trade. Clicking on the removal checkboxes 58, then clicking the remove link 59 causes any selected invoice records to disappear from this trading cart page 57.

Clicking on the "delete cart" page de-selects all the invoices and returns the user to the trading page 36.

Figure 8B:
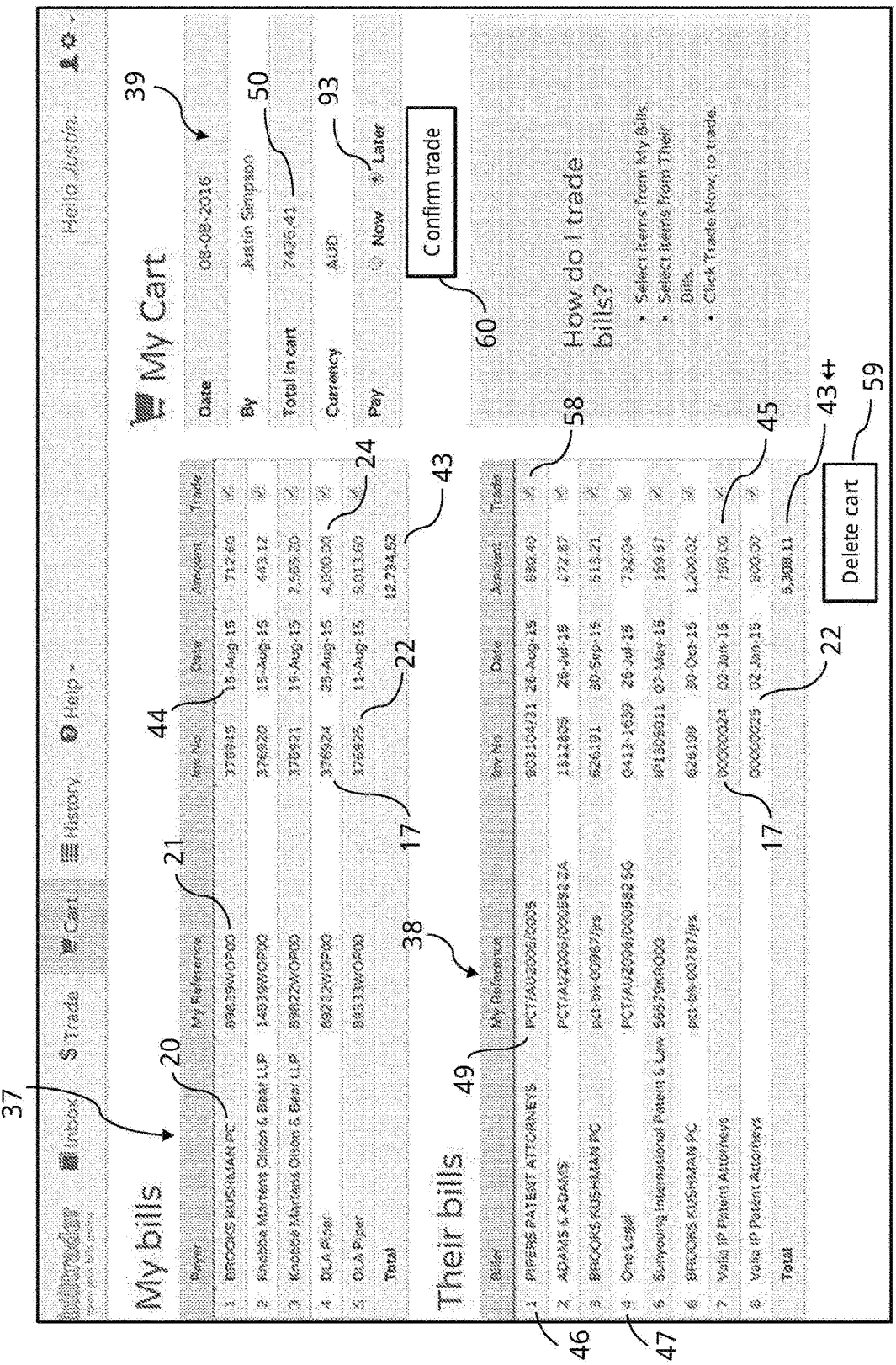

As described above, the radio button 93 allows the user to toggle between a spot trade (i.e. pay now) and a forward exchange contract (i.e. pay later). Referring to FIG. 8B, as the radio button 93 is toggled, the displayed individual invoice amounts 45 of "Their bills" change to reflect the forward or spot exchange rates. The invoice amounts 24 in the "My bills" section do not change as they are in the user's home currency.

Once the user clicks the confirm trade button 60, system 75 implements a number of steps. Firstly, the invoice status 35 for each of the invoice records 11 on the trading cart page 57 are changed to "Traded" and this status is recorded in the invoice database 3 in the memory 3 of the system 75. Secondly, for each of Their bills on the page, the displayed invoice amount 45 is written to a traded amount field 61 in the invoice record 11 of each traded invoice. Thirdly a trade file 62 (described below with reference to Figure 10) is created and stored in the memory 3.

Figure 9:
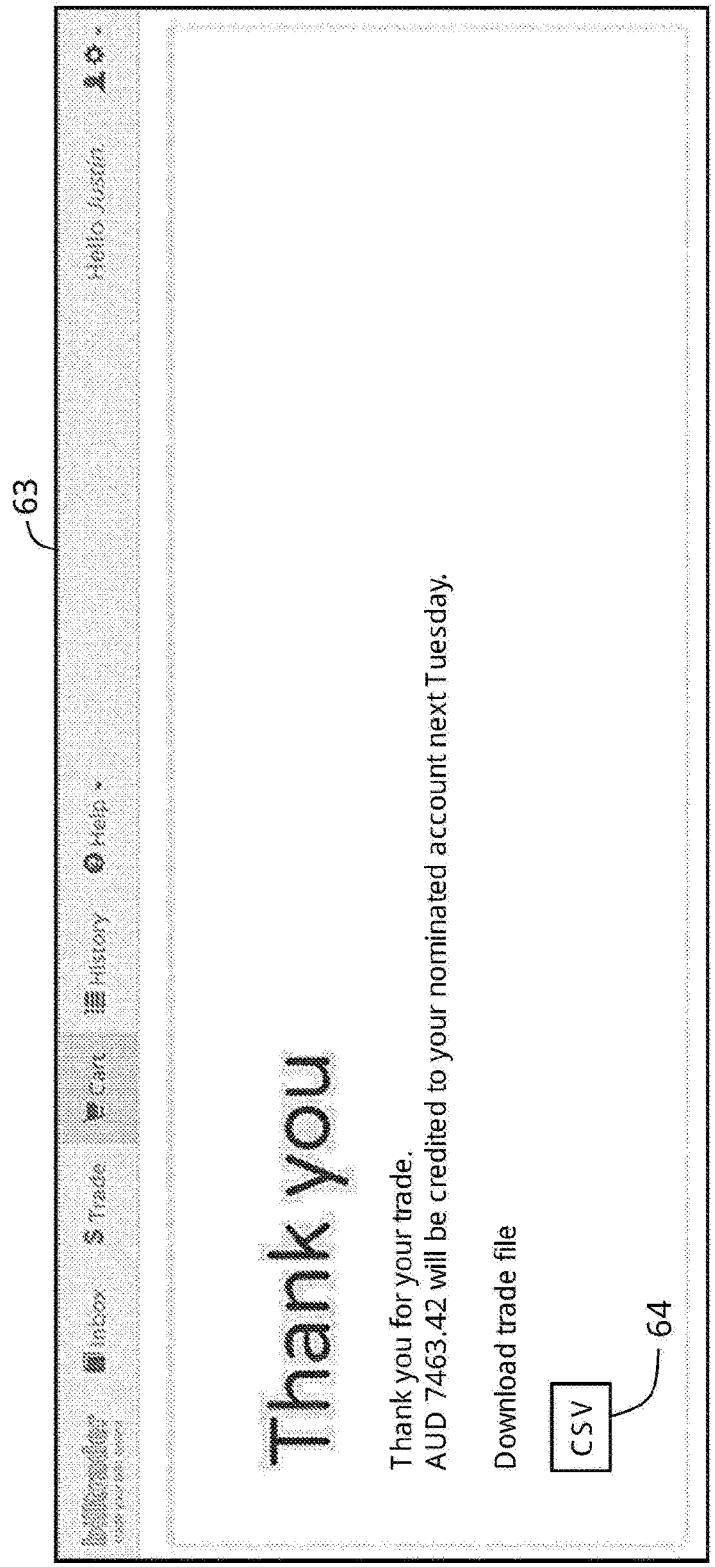
FIG. 9 is a screen shot of a thank you page according to an embodiment of the invention.
Figure 10:
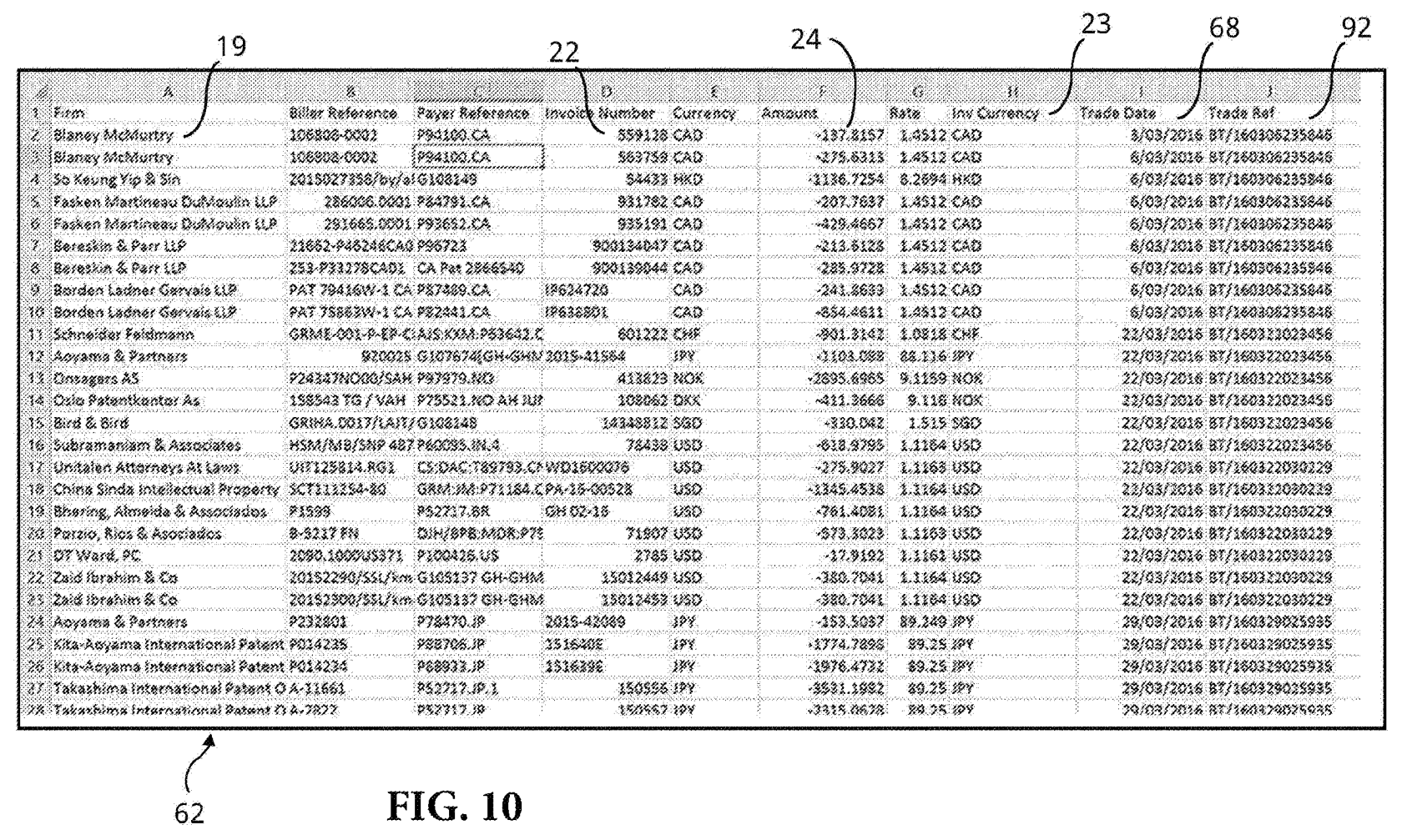

Turning now to FIG. 9 there is shown a screen shot of a thank you page 63 where the user can download the trade file 62 via a trade file download button 64. An exemplary trade file 62 is shown in Figure 10. The trade file includes a biller name 19, an invoice number 22, an invoice amount 24, an invoice currency 23, a trade date 68 indicating the date the invoices were traded, and a trade reference 92 that is an internal reference linking all of the simultaneously traded bills. In its preferred form, the "download button" 64 is clicked, the system 75 looks up the user's accounting software upload format from the client database and generates the trade file in a compatible format. In this way, the field headers, date formats and the like are in a form that allows the user to upload a record of the bills they have traded, without manual data entry. The operator (e. g. BillTrader) of the system 75 assumes the responsibility of paying the foreign agents (i.e. suppliers), the user can upload the trade file into their accounting software 79 with all of the invoice statuses marked as "paid". From the user's perspective the agents have been paid, so the invoice status can reflect that. It is up to BillTrader to follow through with the actual payments to the foreign suppliers, but the user's work has been completed.

Figure 11:
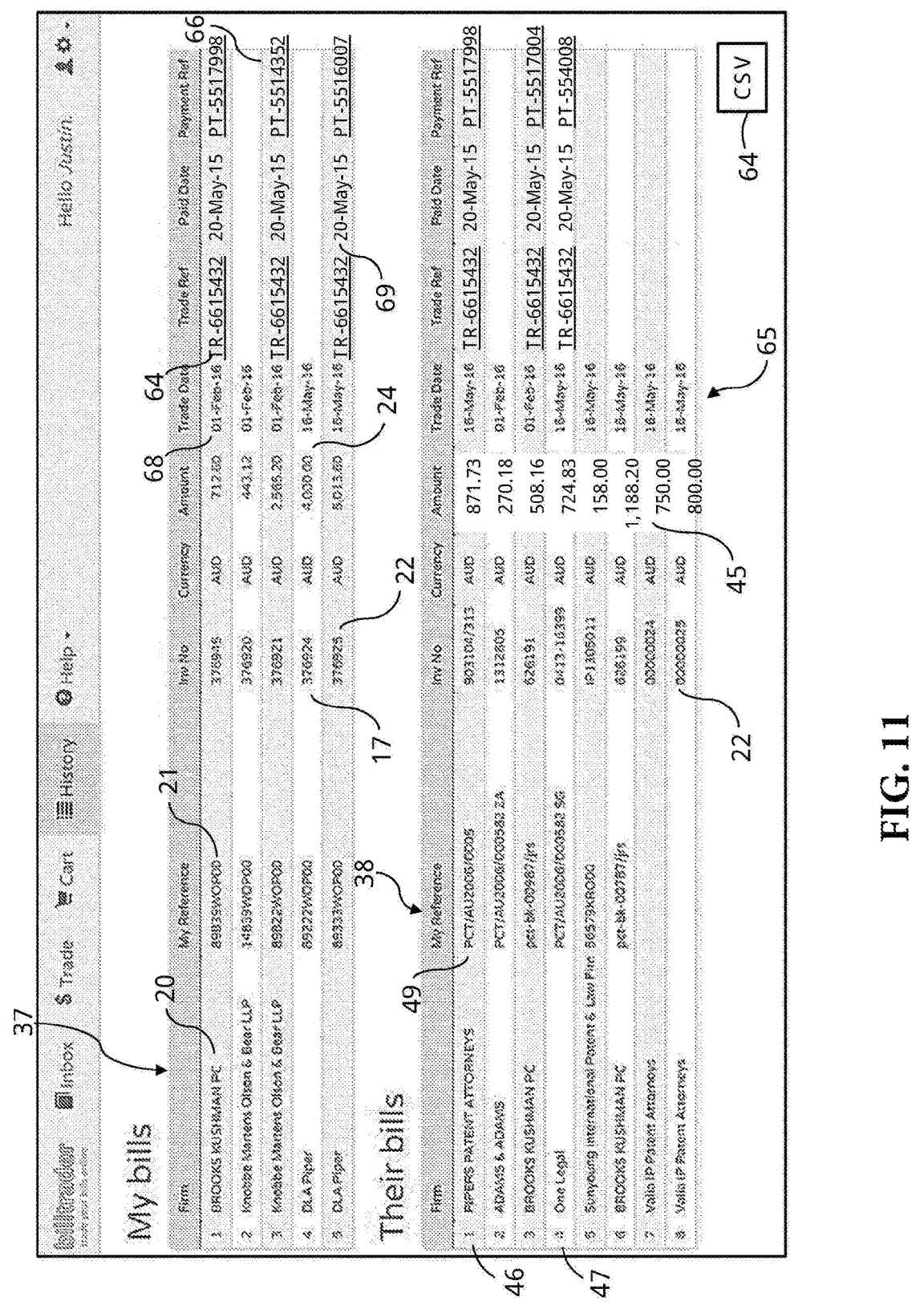

Turning now to Figure 11 there is shown a screen shot of a history page 65 which shows a summary of all historical invoice trades that have taken place. The trade file 62 is also available for download via trade file download button 64 on this page.

Most of the information on the history page 65 corresponds with information previously described, with the exception of the trade date 68, the trade file links 64, the paid date 69 and the payment reference links 66. Once an invoice system operator, such as BillTrader, pays the foreign attorney invoices, a payment confirmation file 66 is stored in the corresponding invoice record 11 in the invoice database 4. The payment confirmation file 67 is typically an image file (such as in PDF JPEG format) provided by the paying bank which a user can access via the payment reference links 66. The trade date 68 is the date the trade took place. The paid date 69 is the date BillTrader paid the invoice amount to the biller.

Turning now to Figure 12 there is shown a flow chart of a process according to this embodiment by which the trading system 75 may automatically generate a trading instruction file 106 from the trade file 62. The trade file 62 generated by system 75 once a trade has been performed may be generated in any of a variety of formats, including as a .CSV file. The trade file 62 includes similar information to that on the history page 65, such as the firm name 20, the biller reference 21, the payer reference 49, the invoice number 22, the trade currency 107 (being the currency the client traded the invoices into, also known as their operating currency), the invoice amount 24, the invoice currency 23, the trade date 69 and the trade reference 64.

System 75 generates such a trade file 62 at the end of a trading day; trade file 62 includes details of every trade performed in the system 75, which is useful information. However, it is not possible to use the contents of that file to buy and sell currency via a foreign exchange trading software as the format of the file is inconsistent with the format of the files use in such trading software. The trading system 75 therefore performs, according to this embodiment, a number of manipulations in order to alleviate the incompatibility.

In a first phase, the system 75 generates a first consolidated trading summary 72 by taking all the amounts in the trade currency 107 column, grouping them by currency and storing them in a "sell" column 109. In this way the system is calculating the total amounts of each currency it needs to buy, since the trading currency 107 is the amount that the user will provide when initiating a payment process. The system does a similar summing of the amounts in the invoice currency 23 column and stores them in the "buy" column 108 of the consolidated trading summary.

In a second phase, the trading system 75 generates a second consolidated trading summary 110 by determining, for each currency presented in either the buy or sell columns, which amount is higher. If the amount is higher in the buy column, the amount for the same currency in the sell column is deleted and subtracted from the amount in the buy column. In the example shown, the buy column reflects 5,600 Canadian dollars and the sell column reflects 1,200 Canadian dollars. The second phase manipulation deletes the CAD1.200 from the sell column 109 and subtracts it from the CAD5.600 in the buy column 108 to leave CAD4.400 in the buy column.

In this way, after the second phase manipulation the second consolidated trading summary reflects the total number of each currency that the system operator needs to buy or sell. In this example it needs to buy CAD4.400, DKK411 and JPY1.103 and it needs to sell EUR14.000, AUD7.000 and USD7.178.

In a third phase, the-trading system 75 converts the second consolidated trading summary 110 into a trading instruction file 106 which is suitable for upload to a foreign exchange software system. The trading instruction file 106 includes a number of fields including a buy amount 111, a buy currency 112, a sell amount 113 and a sell currency 114. When uploaded to a foreign exchange software system, the trading instruction file 106 initiates consolidated trading instructions equivalent to all of the individual trades in the trade file 62.

By converting the trade file 62 into the trading instruction file 106 by this preferred method, the system 75 substantially reduces the computer resources needed to effect the actual foreign exchange trades, because the number of consolidated trades in the trading instruction file 106 is significantly smaller than the individual invoice trades in the trade file 62. Furthermore, the trade file 62 is not compatible with foreign exchange software so eliminating this incompatibility improves the interoperability of the user interface 8 and the foreign exchange software.

Turning now to FIG. 13A there is disclosed an invoice access system 76 according to a preferred embodiment. System 76 provides a user with semi-secure access to a stored invoice. Invoice information is generally not highly confidential and, with hundreds or thousands of users accessing thousands of invoices around the world, it is not ideal to require each user to remember a username and password. In this embodiment, the system 76 grants access to a user if the domain name portion of the email address of the user matches the domain stored against either the biller or the payer that corresponds to an invoice. Generally speaking, an employee of a patent attorney firm will have an email address that matches the domain of that firm's website and that domain is unique to that firm. By employing this semi-secure access approach any employee of a particular firm can be provided with access to the invoices their firm has either sent or received.

In further detail with reference to FIG. 13A, the invoice access system 76 includes a processing computer having a central processing unit 2 and a memory 3. The memory 3 has an invoice database 4, which has a number of invoice records 11 each having an invoice number 22. The memory 3 also stores a supplier database 6 which stores a number of supplier records 28. The supplier records 28 each include a supplier domain 94 which is the portion of an email address following the @ symbol in a patent attorney's email address. That supplier domain serves to uniquely identify the patent firm that the supplier comes from.

The memory 3 also includes a client database 5 which holds a number of client records 13. The client records 13 have stored within them a client domain 94 where the client domain is the section of a patent attorney firm client's email address that follows the @ symbol.

Figure 13B:
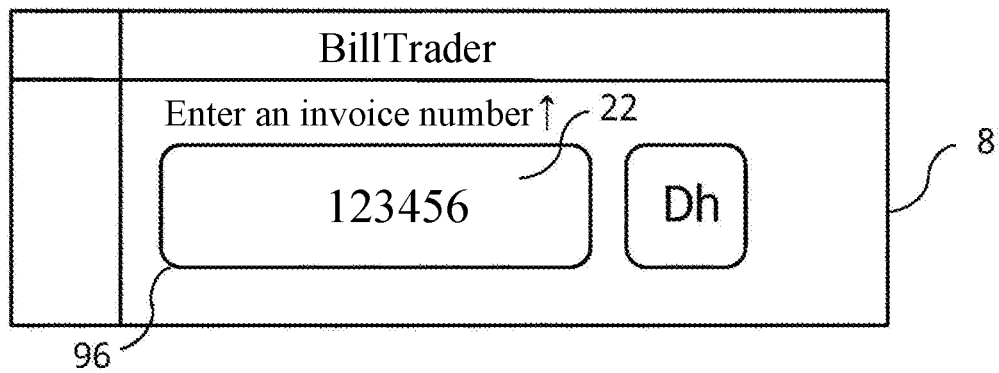
FIG. 13B is a schematic view of an invoice number field of the user interface of the system of FIG. 13A.
Figure 13C:
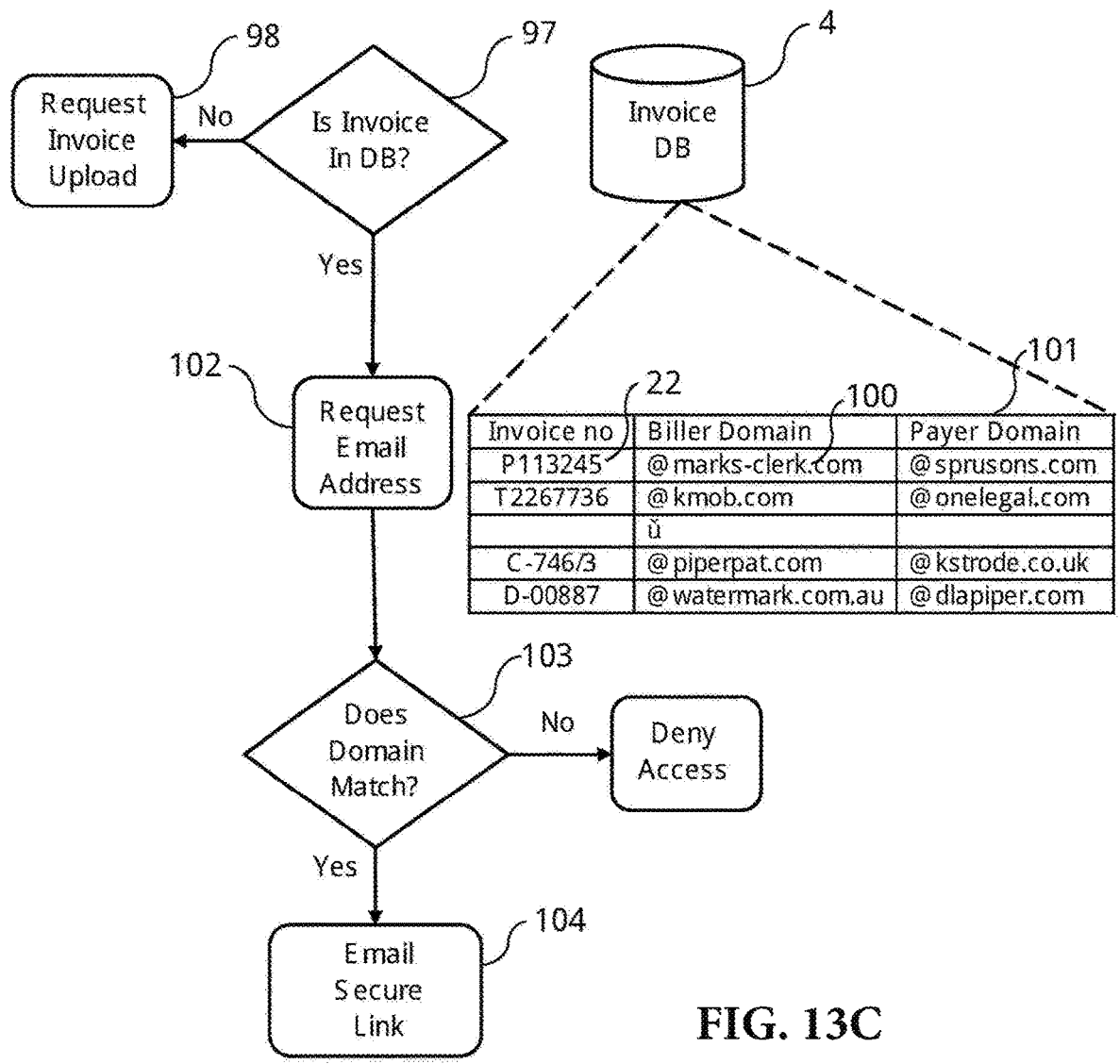
FIG. 13C is a flow chart illustrating the operation of the system of FIG. 13A.

FIG. 13B is a schematic view of an invoice number field 96 of the user interface 8, in which the user may enter an invoice number 22, while FIG. 13C is a flow chart illustrating the operation of the system 76 of FIG. 13A. Referring to FIG. 13C, upon entering an invoice number 22 into invoice number field 96 of the user interface 8, the system 76 queries 97 the invoice database 4 to identify whether the supplied invoice number exists therein. If not, system 76 responds by requesting 98 that the user upload a copy of a new invoice image. If the supplied invoice number 22 is found in the invoice database 4, the system 76 responds by requesting 102 the user's email address 99. Upon receiving the user email address 99, the system 76 responds by comparing 103 the domain name portion of the user's email address with supplier 94 and client domains 95 stored in the supplier 6 and client 5 databases respectively.

In an alternative embodiment, the biller domain 100 and payer domain 101 (which correspond to the supplier 94 and client 95 domains) are stored in the invoice database 4, and the system 76 searches that database instead of the supplier 6 and client 5 databases.

Figure 14:
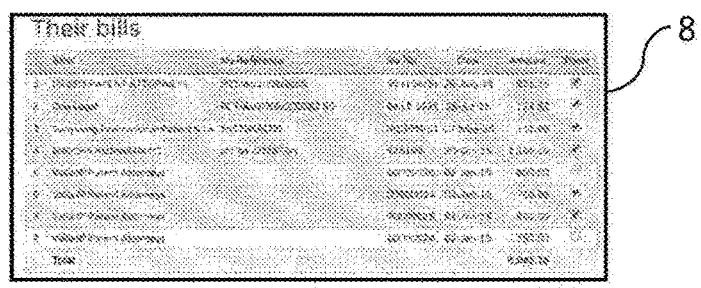
FIG. 14 is an exemplary output of the system of FIG. 13A.

If system 76 finds a match between the user's domain and either the biller domain 100 or the payer domain 101, the system 76 not only displays (as illustrated in FIG. 14) on the user interface 8 the client invoice number entered but also any invoices stored in the invoice database 4 where either the domains corresponding to the biller name 19 or payer name 20 match the user's domain.

In this way, upon entering a single invoice number, the user is able to trade not only the invoice in question, but any outstanding invoices by them or their overseas suppliers.

Preferably, an intermediate verification step occurs in which a secure URL is sent 104 via email to the user's email address 99. In response to the user's clicking that secure link, the system 76 displays details of the invoice record 11 entered earlier on the user interface 8. From that user interface 8, the user also has access to the complete set of invoices records 11 stored in the invoice database 4 where the user's firm is either the biller of the payer.

In practice the system 76 will establish a semi-secure session upon clicking the secure URL. That session provides credentials to the user interface 8; these credentials allow the user, during that session, to access any invoice records where the biller name or payer name match the user's domain. In this way, without having to provide a password, a user can gain access to the bills they owe or are owed via the user interface 8.

In the preferred embodiment, once the session ends (by the user leaving the website, or being timed out via the system after a period of inactivity), the secure URL no longer works. In order to re-view the invoice the user has to re-enter the invoice number 22 in question and they will again receive a secure URL after
providing their email address. In this way, the secure URL is a one-time use session identifier providing temporary credentials for the user to access the invoices owing to or from their firm.

Turning now to FIG. 15, there is shown a block diagram of a computer-implemented invoice payment system 77 according to an embodiment of the present invention. The system 77 includes a central processing unit 2 and a computer-readable storage medium in the form of a memory 3.

The memory includes an invoice database 4, a client database 5, a supplier database 6, an exchange rate database 70, a bank rule database 71 and program instructions in the form of software 7 stored thereon. The invoice payment system 77 is in communication with a user interface 8, such as a website, via a network 9, such as the internet. The system 77 is further in communication with a plurality of banking systems 78 and 78' in both the user's country and in foreign countries, via the network 9.

Upon receipt of a plurality of supplier invoice records that require payment in a plurality of foreign currencies, the system performs a number of steps including:
a) grouping supplier invoices into currency sets; .
b) summing the invoices in each currency set in their respective foreign currencies; and
c) generating a series of funds transfer instructions.

The funds transfer instructions include a single international funds transfer instruction for transferring the total amount in a single currency set into a foreign bank account and a plurality of local funds transfer instructions for transferring funds between banks located in the same foreign currency.

For example, one Australian patent attorney firm has forty supplier invoices to pay. Those supplier invoices come from patent firms in the USA, China and Japan. Fifteen of the invoices are from the USA and add up to US$135,000. Twelve of the invoices come from China and add up to CNY780,000 and the remaining thirteen invoices from Japan add up to JPY1,200,000.

While traditional international funds transfer approaches would involve 40 international funds transfers, which incur 40 sets of international banking fees and perform 40 currency exchange rates, the present system instead generates the following funds transfer instructions:
a) Three international funds transfer instructions from the Australian BillTrader bank account to BillTrader bank accounts located in the USA, China and Japan; and
b) Forty local funds transfer instructions, being:
 1. Fifteen local funds transfer instructions totaling US$135,000 from BillTrader's US bank account to the fifteen US patent firm bank accounts;
 2. Twelve local funds transfer instructions totaling CNY780,000 from BillTrader's Chinese bank account to the twelve Chinese patent firm bank accounts;
 3. Thirteen local funds transfer instructions totaling JPY1,200,000 from BillTrader's Japanese bank account to the thirteen Japanese patent firm bank accounts.

The forty-three funds transfer instructions may be saved as a set of funds transfer data files and distributed electronically to the respective banks performing the funds transfers.

This embodiment is described in greater detail with reference to FIG. 16, which is a flow diagram illustrating the operation of the computer-implemented invoice payment system 77 according to an embodiment of the invention. Instead of sending individual international wire transfer payments to individual third party bank accounts in foreign countries, the system 77 generates a first wave of transfers between internal bank accounts and a second wave of transfers to third party bank accounts.

Figure 16:
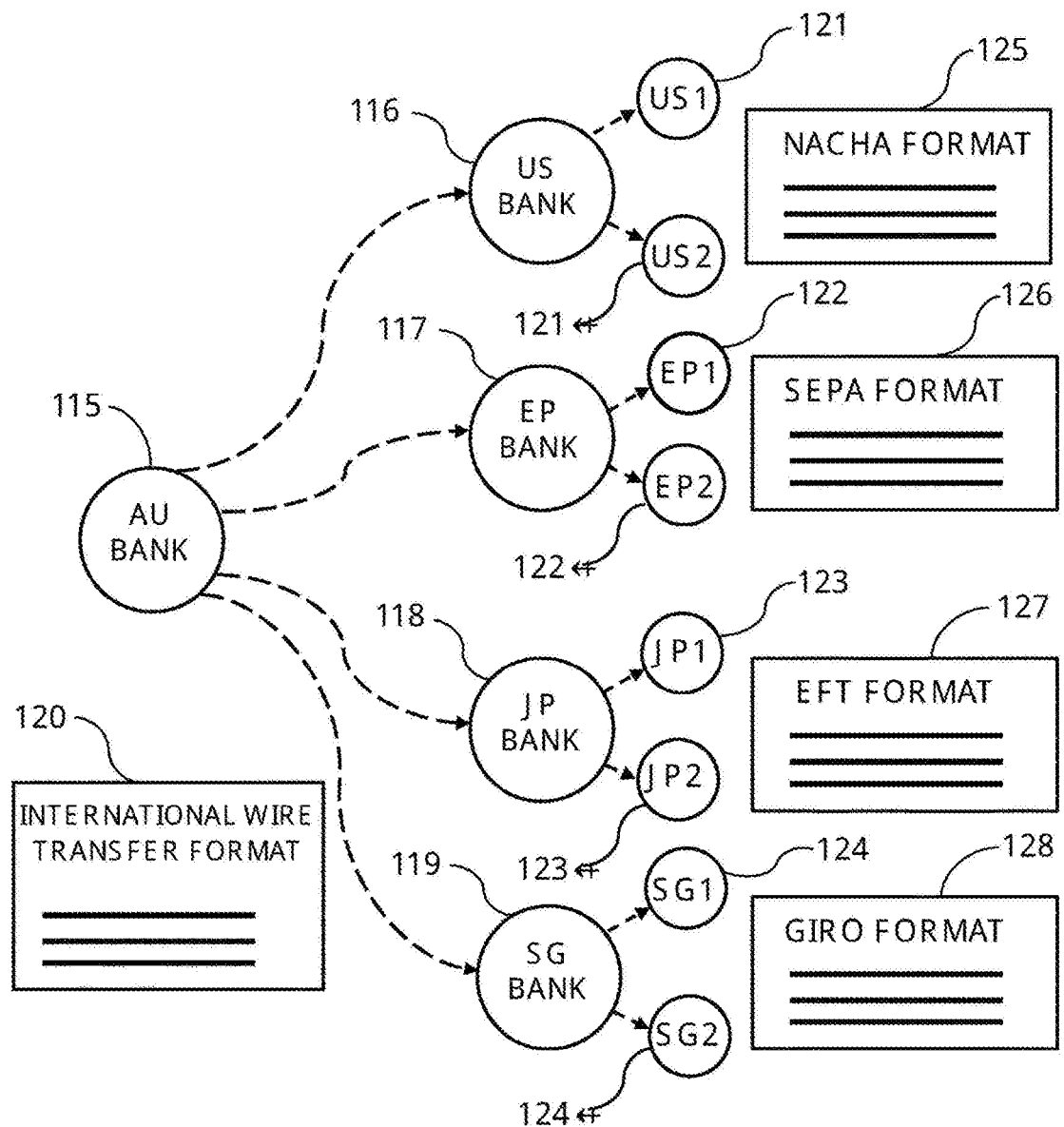
FIG. 16 is a flow diagram illustrating the operation of the computer-implemented invoice payment system according to an embodiment of the invention.

In Figure 16, there is shown an Australian internal bank account 115 (an 'internal' bank account being an account owned and operated by the user of the payment system 77) from which the system 77 sends a series of international wire transfers triggered by an international wire transfer file 120. The international wire transfer file 120 contains a summary of the total amounts in the various countries that need to be paid, and is formatted in a manner compatible with the system operator's internal Australian (in this example) banking system 78.

In this example, the Australian internal bank account 115 sends a series of international wire transfers to a United States internal bank account 116 located in America, a European internal bank account 117 located in Finland, a Japanese internal bank account 118 located in Japan and a Singaporean internal bank account 119 located in Singapore.

In the second wave of transfers, each triggered by a transfer file produced by the payment system 77 in accordance with the format of bulk transfers required in each country and uploaded to the internal bank accounts operated overseas, a number of domestic transfers are made. As shown, the NACHA format file 125 triggers a number of domestic transfers from the internal US bank account 116 to a plurality of domestic third party bank accounts 121, 121' all located in the United States. The SEPA format file 126 triggers a number of domestic transfers from the internal European bank account 117 to a plurality of domestic third party bank accounts 122, 122' all located in the European Union. The EFT format file 127 triggers a number of domestic transfers from the internal Japanese bank account 118 to a plurality of domestic third party bank accounts 123, 123' all located in Japan. Similarly, the GIRO format file 128 triggers a number of domestic transfers from the internal Japanese bank account 118 to a plurality of domestic third party bank accounts 124, 124' all located in Singapore.

The skilled addressee will appreciate that many other formats are possible in accordance with the banking practices and requirements of different countries and jurisdictions.

The payment system 77 generates the international wire transfer file 120 in similar way in which the trading system 75 generates the trading instruction file, as illustrated in FIG. 12. In a first phase the system takes the trade file 62 and produces a consolidated payment file which just looks at the invoice amounts in each country, but groups them by the supplier country 81. For each country it sums the amounts that need to be paid and adds the details of the internal bank account (e.g. 116) in that country. It then reformats the file into a form acceptable to the system operator's internal bank system 78 and preferable transits the file 120 to the bank system 78 for automated payment.

When producing the individual country files, such as the NACHA format file the payment system 77 parses the trade file 62 for each country and identifies those invoices which are payable to suppliers in a particular supplier country 81. Once found, it then looks up the bank rule database to 71 determine the correct file format for that country and the requisite fields. Once found it creates a NACHA format file 125 which includes every invoice that needs to be paid, with bank account details of each supplier being retrieved from the supplier database 6.

The process is then repeated for each country or jurisdiction, identifying the correct file format from the bank rule database 71, selecting the invoices payable to suppliers in that country, identifying the corresponding bank accounts of those suppliers from the supplier database 6 and generating the SEPA 126, EFT 127 or GIRO 128 payment file, as appropriate to the country mix. Preferably the system then transmits each of the transfer files via the network 9 to the banking system 78' corresponding to each of the internal bank accounts 116-119 in the foreign countries.

More preferably, the system sends the first international wire transfer using the international wire transfer file 120 on working day 1, then waits until, for example, working day 3 to sends the plurality of domestic wire transfer instructions using the various domestic transfer files 125-128. In that way, the international wire transfer is given enough time to arrive and be processed before the subsequent domestic transfers are initiated.

The above embodiments have been presented illustratively to assist the addressee understand the structure and function of those embodiments. That addressee will also appreciate, particularly given the benefit of the teaching herein, that various features and functions from the embodiments are selectively available in combination, or are interchangeable or omissible depending, upon the specifics of the precise implementation of an embodiment. The intention of the inventors in providing the exemplary embodiments is to demonstrate the implementation of the invention and not to suggest that those features and functions are not able to be added substituted or omitted from other possible embodiments.

Although the invention has been described with reference to specific examples, it will be appreciated by those skilled in the art that the invention may be embodied in many other forms, including but not limited to being embodied as devices, systems and methods.

In the claims that follow and in the preceding description of the invention, except Where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the Common general knowledge in any country.

FIGURE REFERENCES

The following Figure reference table is provided for the reader's ease of understanding:

1 invoice capture
2 Central processing unit
3 Memory
4 Invoice database
5 Client database
6 Supplier database
7 Software
8 User interface
9 Network
10 Invoice inbox page
11 Invoice record
12 Physical invoice
13 Client record
14 Dedicated invoice email address
15 Invoice inbox
16 Invoice image
17 Link to invoice image
18 Key invoice information
19 Biller name
20 Payer name
21 Biller reference
22 Invoice number
23 Invoice currency
24 Invoice amount
25 Ready to trade button
26 Upload button
27 Editable columns
28 Supplier records 29 Supplier name
30 Supplier currency
31 Pairing information and payment system
32 Client name
33 Checkboxes
34 Update button
35 Invoice status
36 Trading page
37 My bills section
38 Their bills section
39 Trading summary section
40 Payment status
41 Invoice total
42 Trading checkboxes
43 Trading total
44 Invoice date
45 Displayed invoice amount
46 PIPERS invoice record
47 OneLegal invoice record
48 SunYoung invoice record
49 Payer reference
50 Difference
51 Trade button
52 Exchange rate feed
53 Buy exchange rate
54 Sell exchange rate
55 Mid-market exchange rate
56 Forward exchange rate
57 Trading cart page
58 Removal checkboxes
59 Delete cart button
60 Confirm trade
61 Traded amount
62 Trade file
63 Thank you page
64 Trade file download button
65 History page
66 Payment reference link 96 Invoice number field
68 Trade date
69 Paid date
70 Exchange rate database
71 Bank rule database
72 Consolidated trade summary
73 FX trade instruction
74 Invoice capture system
75 Invoice trading system
76 Invoice access system
77 Invoice payment system
78 Banking system
79 Accounting software package
80 Payer's reference
81 Supplier country
82 Bank country
83 Bank account template
84 Supplier's bank information
85 Required bank field
86 Optional bank field
87 Bank field synonyms
88 My reference
89 Invoice upload file
90 Required invoice fields
91 Invoice upload file
92 Trade reference
93 Radio button
94 Supplier domain
95 Client domain
96 Invoice number field
97 Queries invoice database
98 Requests invoice upload
99 User email address
100 Biller domain
101 Supplier domain
102 Requests email
103 Compares domain
104 Secure URL sent
105 Secure URL
106 Trading instruction file
107 Trade currency
108 Buy column
109 Sell column
110 Second consolidated trading summary
111 Buy amount
112 Buy currency
113 Sell amount
114 Sell currency
115 Australian internal bank account
116 US internal bank account
117 European internal bank account
118 Japanese internal bank account
119 Singaporean internal bank account
120 International wire transfer file Ref Item Ref Item
121 Third party US bank account
122 Third party EP bank account
123 Third party JP bank account
124 Third party SG bank account
125 NACHA transfer file
126 SEPA transfer file
127 EFT transfer file
128 GIRO transfer file
129 Consolidated payment file

What is claimed is:

1. A system comprising:
a processor having an associated memory and configured to automatically:
receive an electronically transmitted invoice from a biller;
identify at least a payor, biller, biller currency, and biller amount from the invoice;
validate the payor by comparison to payors stored in the associated memory and predesignated with respect to a first account corresponding to the biller;
responsive to validation success, create an invoice record in the associated memory including at least the payor, biller, biller currency, and biller amount;
determine a list of fields required by an accounting system corresponding to the payor as indicated by data accessible by the processor and previously defined with respect to the payor, the fields including at least a payor matter reference field, a biller matter reference field, and a payor currency;
identify field-information corresponding to each element of the list of fields from the invoice, the field-information including at least a payor matter reference corresponding to the payor matter reference field, a biller matter reference corresponding to the biller matter reference field, a biller currency and a biller amount, the payor matter reference being different from the biller matter reference;
save the field-information including at least the payor matter reference, the biller matter reference, the biller currency, and the biller amount with respect to the invoice;
responsive to a request from the payor identifying the first invoice record, automatically performing a currency conversion of the biller amount from the biller currency into the payor currency, the converted amount being a payor amount, and automatically create an accounting file based on the invoice record, including the identified field-information required by the accounting system corresponding to the payor, the field-information retrieved from the first invoice record; and responsive to creating the accounting file, automatically upload the created accounting file to the accounting system corresponding to the payor.

2. The system of claim 1, wherein the processor is further configured to convert the accounting file into an Extensible Markup Language (XML) file compatible with an Application Programming Interface (API) associated with the accounting system, based on XML rules defined for the API and accessible by the processor.

3. The system of claim 1, where the invoice is an emailed invoice and wherein the identification of the biller includes identifying the biller based on an email address from which the invoice was received.

4. The system of claim 1, wherein the processor is further configured to automatically:

access a record associated with the biller to retrieve a biller identification pattern, saved in the record with respect to the biller and indicating a format for how the biller identifies a type of record corresponding to a given payor, and a payor identification pattern, saved in the record with respect to the biller and indicating a format for how the given payor identified the type of record corresponding to the given payor;

based on the biller identification pattern, identify the field-information corresponding to the biller matter reference from the invoice;

based on the payor identification pattern, identify the field-information corresponding to the payor matter reference from the invoice; and save the identified biller matter reference and payor matter reference with respect to the biller matter reference field and the payor matter reference field, respectively, to the invoice record.

5. The system of claim 1, wherein the processor is further configured to:

receive a trade request from a user;

search a plurality of invoice records for identification of the user as a saved payor in a given invoice record of the plurality of invoice records;

determine a first invoice subset of the plurality of invoice records that indicate the user as the saved payor and that also indicate an unpaid owed-amount associated with the payor; and present the first invoice subset to the user.

6. The system of claim 5, wherein the processor is further configured to:

responsive to the trade request, further search the plurality of invoice records for identification of the user as a saved biller in a given invoice record of the plurality of the invoice records;

determine a second subset of the plurality of invoice records that indicate the user as the saved biller and that also indicate an unpaid due-amount associated with the biller; and present the second invoice subset to the user.

7. The system of claim 6, wherein the processor is further configured to:

receive identification of one or more of the invoice records in the first subset;

receive identification of one or more of the invoice records in the second subset;

reconcile the identified one or more invoice records in the first subset with the one or identified invoice records in the second subset to determine a net difference;

create an accounting file indicating that the identified one or more invoice records in the first subset and the identified one or more invoice records in the second subset have been paid, the accounting file including the net difference in the accounting file as an amount owed or an amount due, based on whether a total value of the identified invoice records in the first subset is greater or a total value of the identified invoice records in the second subset is greater, respectively, and the processor configured to create the accounting file in or convert the accounting file into a format compatible with an accounting system identified with respect to the user; and provide the accounting file to the accounting system.

8. A computer-implemented method comprising:

receiving an invoice from a biller;

identifying at least a payor, biller, a biller currency, and a biller amount from the invoice;

creating an invoice record including at least the payor, biller, biller currency, and biller amount;

determining a list of fields required by an accounting system corresponding to the payor as indicated by data accessible by the processor and previously defined with respect to the payor;

identifying field-information corresponding to each element of the list of fields from the invoice;

saving the field-information with respect to the invoice;

responsive to a request from the payor identifying the first invoice record, automatically performing a currency conversion of the biller amount from the biller currency into the payor currency, the converted amount being a payor amount, and creating an accounting file based on the invoice record, including the identified field-information required by the accounting system corresponding to the payor and including the payor currency and payor amount, the field-information retrieved from the first invoice record;

responsive to creating the accounting file, uploading the created accounting file to the accounting system corresponding to the payor;

receiving a trade request from a user;

responsive to the trade request:

searching a plurality of invoice records for identification of the user as a saved payor in a given invoice record of the plurality of invoice records;

determining a first invoice subset of the plurality of invoice records that indicate the user as the saved payor and that also indicate an unpaid owed-amount associated with the payor in the payor currency;

presenting the first invoice subset to the user;

further searching the plurality of invoice records for identification of the user as a saved biller in the given invoice record of the plurality of the invoice records;

determining a second subset of the plurality of invoice records that indicate the user as the saved biller and that also indicate an unpaid due-amount associated with the biller in the payor currency; and presenting the second invoice subset to the user.

9. The method of claim 8, further comprising converting the accounting file into an Extensible Markup Language (XML) filed stored in a computer readable memory and compatible with an Application Programming Interface (API) associated with the accounting system, based on XML rules defined for the API.

10. The method of claim 8, further comprising:
accessing a record associated with the biller to retrieve a biller identification pattern, saved in the record with respect to the biller and indicating a format for how the biller identifies a type of record corresponding to a given payor, and a payor identification pattern, saved in the record with respect to the biller and indicating a format for how the given payor identified the type of record corresponding to the given payor;
based on the biller identification pattern, identifying a biller record number from the invoice corresponding to the biller identification pattern;
based on the payor identification pattern, identifying a payor record number from the invoice corresponding to the payor identification pattern; and
saving the identified biller record number and payor record number with respect to the invoice record.

11. The method of claim 8, further comprising:
receiving identification of one or more of the invoice records in the first subset;
receiving identification of one or more of the invoice records in the second subset;
reconciling the identified one or more invoice records in the first subset with the one or identified invoice records in the second subset to determine a net difference in the payor currency;
creating an accounting file indicating that the identified one or more invoice records in the first subset and the identified one or more invoice records in the second subset have been paid, the accounting file including the net difference in the accounting file as an amount owed or an amount due in the payor currency, based on whether a total value of the identified invoice records in the first subset is greater or a total value of the identified invoice records in the second subset is greater, respectively, and the accounting file created in or converted into a format compatible with an accounting system identified with respect to the user; and
providing the accounting file to the accounting system.

12. The method of claim 8, further comprising:
for each of the identified invoice records in the first subset, including an amount corresponding to the owed-amount into a trade record, the amount corresponding to the owed-amount included in the trade file in a currency corresponding to a locality associated with a biller associated with a given identified invoice record in the first subset;
for each of the identified invoice records in the second subset, including an amount corresponding to the due-amount into the trade record, the amount corresponding to the due-amount included in the trade file in a currency corresponding to a locality associated with the user;
aggregating a plurality of trade records into a trade summary indicating a total currency amount necessary, for each locality for which at least one amount has been included in at least one of the trade records, to reconcile any payments to entities or from entities within a respective locality, as indicated by one or more of the trade records; and
generating a consolidated buy or sell instruction for at least one locality, based on whether an amount of payments to entities is greater or an amount of payments from entities is greater, respectively, for the at least one locality, the buy or sell instruction for the indicated total currency amount necessary for the at least one locality, the consolidated buy or sell instruction formatted in accordance with banking rules associated with electronic transactions for banks in the at least one locality.

13. A non-transitory storage medium, storing instructions that, when executed, cause a processor to perform a method comprising:
receiving an invoice from a biller;
identifying at least a payor, biller, biller currency, and biller amount from the invoice;
creating an invoice record including at least the payor, biller, biller currency, and biller amount;
determining a list of fields required by an accounting system corresponding to the payor as indicated by data accessible by the processor and previously defined with respect to the payor, the fields including at least a payor matter-reference field, a biller matter-reference field, a biller currency and a biller amount;
identifying field-information corresponding to each element of the list of fields from the invoice, the field information including at least a payor matter reference and a biller matter reference;
saving the field-information with respect to the invoice;
receiving a trade request from a user;
searching a plurality of invoice records for identification of the user as a saved payor in a given invoice record of the plurality of invoice records;
determining a first invoice subset of the plurality of invoice records that indicate the user as the saved payor and that also indicate an unpaid owed-amount associated with the payor in the payor currency;
presenting the first invoice subset to the user;
responsive to the trade request, further searching the plurality of invoice records for identification of the user as a saved biller in a given invoice record of the plurality of the invoice records;
determining a second subset of the plurality of invoice records that indicate the user as the saved biller and that also indicate an unpaid due-amount associated with the biller in the payor currency;
presenting the second invoice subset to the user;
receiving identification of one or more of the invoice records in the first subset;
receiving identification of one or more of the invoice records in the second subset;
reconciling the identified one or more invoice records in the first subset with the one or identified invoice records in the second subset to determine a net difference in the payor currency; and
presenting the net difference to the user.

14. The storage medium of claim 13, wherein the method further includes:
responsive to a request from the payor identifying the first invoice record, creating an accounting file based on the invoice record, including the identified field-information required by the accounting system corresponding to the payor, the field-information retrieved from the first invoice record; and
responsive to creating the accounting file, uploading the created accounting file to the accounting system corresponding to the payor.

15. The storage medium of claim 14, wherein the method further includes: converting the accounting file into an Extensible Markup Language (XML) compatible with an Application Programming Interface (XML) associated with the accounting system, based on XML rules defined for the API.

16. The storage medium of claim 13, wherein the method further includes:
- accessing a record associated with the biller to retrieve a biller identification pattern, saved in the record with respect to the biller and indicating a format for how the biller identifies a type of record corresponding to a given payor, and a payor identification pattern, saved in the record with respect to the biller and indicating a format for how the given payor identified the type of record corresponding to the given payor;
- based on the biller identification pattern, identifying a biller record number from the invoice corresponding to the biller identification pattern;
- based on the payor identification pattern, identifying a payor record number from the invoice corresponding to the payor identification pattern; and
- saving the identified biller record number and payor record number with respect to the invoice record.

17. The storage medium of claim 13, wherein the method further includes:
- receiving identification of one or more of the invoice records in the first subset;
- receiving identification of one or more of the invoice records in the second subset;
- reconciling the identified one or more invoice records in the first subset with the one or identified invoice records in the second subset to determine a net difference in the payor currency;
- creating an accounting file indicating that the identified one or more invoice records in the first subset and the identified one or more invoice records in the second subset have been paid, the accounting file including the net difference in the accounting file as an amount owed or an amount due in the payor currency, based on whether a total value of the identified invoice records in the first subset is greater or a total value of the identified invoice records in the second subset is greater, respectively, and the accounting file created in or converted into a format compatible with an accounting system identified with respect to the user; and
- providing the accounting file to the accounting system.

18. The storage medium of claim 17, wherein the method further includes:
- for each of the identified invoice records in the first subset, including an amount corresponding to the owed-amount into a trade record, the amount corresponding to the owed-amount included in the trade file in a currency corresponding to a locality associated with a biller associated with a given identified invoice record in the first subset;
- for each of the identified invoice records in the second subset, including an amount corresponding to the due-amount into the trade record, the amount corresponding to the due-amount included in the trade file in a currency corresponding to a locality associated with the user;
- aggregating a plurality of trade records into a trade summary indicating a total currency amount necessary, for each locality for which at least one amount has been included in at least one of the trade records, to reconcile any payments to entities or from entities within a respective locality, as indicated by one or more of the trade records; and
- generating a consolidated buy or sell instruction for at least one locality, based on whether an amount of payments to entities is greater or an amount of payments from entities is greater, respectively, for the at least one locality, the buy or sell instruction for the indicated total currency amount necessary for the at least one locality, the consolidated buy or sell instruction formatted in accordance with banking rules associated with electronic transactions for banks in the at least one locality.

19. The method of claim 8 further comprising:
- receiving identification of one or more of the invoice records in the first subset;
- receiving identification of one or more of the invoice records in the second subset;
- reconciling the identified one or more invoice records in the first subset with the one or identified invoice records in the second subset to determine a net difference;
- creating an accounting file indicating that the identified one or more invoice records in the first subset and the identified one or more invoice records in the second subset have been paid, the accounting file including the net difference in the accounting file as an amount owed or an amount due in the payor currency, based on whether a total value of the identified invoice records in the first subset is greater or a total value of the identified invoice records in the second subset is greater, respectively, and the processor configured to create the accounting file in or convert the accounting file into a format compatible with an accounting system identified with respect to the user; and
- providing the accounting file to the accounting system.

* * * * *